United States Patent
Dain et al.

(10) Patent No.: US 10,389,824 B2
(45) Date of Patent: *Aug. 20, 2019

(54) SERVICE MANAGEMENT MODES OF OPERATION IN DISTRIBUTED NODE SERVICE MANAGEMENT

(71) Applicant: International Business Machines Corporation, Armonk, NY (US)

(72) Inventors: Joseph W. Dain, Vail, AZ (US); Stefan Lehmann, Tucson, AZ (US); Dan Melamed, Tel Aviv (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/588,348

(22) Filed: May 5, 2017

(65) Prior Publication Data

US 2017/0244794 A1 Aug. 24, 2017

Related U.S. Application Data

(63) Continuation of application No. 13/571,760, filed on Aug. 10, 2012, now Pat. No. 9,678,802, which is a
(Continued)

(51) Int. Cl.
*G06F 15/173* (2006.01)
*H04L 29/08* (2006.01)
*G06F 9/50* (2006.01)

(52) U.S. Cl.
CPC ............ *H04L 67/16* (2013.01); *G06F 9/5061* (2013.01); *H04L 67/10* (2013.01)

(58) Field of Classification Search
CPC ....... G06F 15/16; G06F 9/5061; H04L 67/16; H04L 67/10
(Continued)

(56) References Cited

U.S. PATENT DOCUMENTS

| | | |
|---|---|---|
| 5,913,060 A | 6/1999 | Discavage |
| 5,960,404 A | 9/1999 | Chaar et al. |

(Continued)

FOREIGN PATENT DOCUMENTS

| | | |
|---|---|---|
| CA | 2645716 A1 | 5/2009 |
| CN | 100390742 | 0/0000 |

(Continued)

OTHER PUBLICATIONS

"Method and Protocol for Fast, Reliable Service Discovery and Service State Change Advertistement Among a Cluster of Computers in a Local Area Network", IP.com, Technical Disclosure, Document No. IPCOM000194489D, Mar. 27, 2010, pp. 1-3.
(Continued)

*Primary Examiner* — David R Lazaro
*Assistant Examiner* — Mariegeorges A Henry
(74) *Attorney, Agent, or Firm* — William K. Konrad; Konrad Raynes Davda & Victor LLP

(57) ABSTRACT

A distributed node service management system utilizes multiple existing processor nodes of a distributed computing system, in support of the primary data processing functions of the distributed computing system. The distributed node service management system coordinates and manages service functions on behalf of processor nodes of the distributed computing system. Other features and aspects may be realized, depending upon the particular application.

36 Claims, 8 Drawing Sheets

Related U.S. Application Data continuation of application No. 13/571,102, filed on Aug. 9, 2012, now Pat. No. 9,678,801.

(58) Field of Classification Search
USPC .................................. 709/201, 223, 226
See application file for complete search history.

(56) References Cited

U.S. PATENT DOCUMENTS

| | | | |
|---|---|---|---|
| 6,144,992 | A | 11/2000 | Turpin et al. |
| 6,973,023 | B1 | 12/2005 | Saleh et al. |
| 7,158,985 | B1 | 1/2007 | Liskov |
| 7,159,150 | B2 | 1/2007 | Kenchammana-Hosekote et al. |
| 7,467,198 | B2 | 12/2008 | Goodman et al. |
| 7,729,290 | B2 | 6/2010 | Saleh et al. |
| 7,778,157 | B1 | 8/2010 | Tawri et al. |
| 7,793,140 | B2 | 9/2010 | Chen et al. |
| 7,853,565 | B1 | 12/2010 | Liskov |
| 8,001,142 | B2 | 8/2011 | Gopinath et al. |
| 8,081,582 | B2 | 12/2011 | Saleh et al. |
| 2003/0149735 | A1 | 8/2003 | Stark et al. |
| 2004/0003076 | A1* | 1/2004 | Hishimoto ............ H04L 41/12 709/223 |
| 2005/0038883 | A1 | 2/2005 | Elko et al. |
| 2006/0069703 | A1 | 3/2006 | Carr et al. |
| 2006/0155802 | A1* | 7/2006 | He ..................... H04L 29/06 709/203 |
| 2007/0077909 | A1 | 4/2007 | Kappes et al. |
| 2008/0256384 | A1 | 10/2008 | Branson et al. |
| 2009/0198549 | A1 | 8/2009 | Kearns et al. |
| 2010/0223379 | A1 | 9/2010 | Tantawi et al. |
| 2010/0232288 | A1* | 9/2010 | Coatney ............ G06F 11/2033 370/221 |
| 2011/0138081 | A1 | 6/2011 | Matsuda et al. |
| 2011/0161724 | A1* | 6/2011 | Matsugashita ...... G06F 11/1662 714/4.11 |
| 2011/0179145 | A1 | 7/2011 | Ravichandran et al. |
| 2011/0282998 | A1* | 11/2011 | Johnsson .......... H04L 29/12283 709/226 |
| 2011/0289344 | A1* | 11/2011 | Bae .................... G06F 11/181 714/4.2 |
| 2013/0166677 | A1* | 6/2013 | Chung ................. G06F 9/542 709/217 |
| 2014/0046997 | A1 | 2/2014 | Dain et al. |
| 2014/0046998 | A1 | 2/2014 | Dain et al. |
| 2014/0047088 | A1 | 2/2014 | Dain et al. |
| 2014/0047116 | A1 | 2/2014 | Dain et al. |
| 2014/0324940 | A1 | 10/2014 | Dain et al. |
| 2014/0325052 | A1 | 10/2014 | Dain et al. |

FOREIGN PATENT DOCUMENTS

| | | | |
|---|---|---|---|
| CN | 1487435 | A | 4/2004 |
| CN | 101291245 | A | 10/2008 |
| CN | 101727629 | A | 6/2010 |
| CN | 102098325 | A | 6/2011 |
| CN | 103581289 | A | 2/2014 |
| GB | 2477514 | A | 8/2011 |
| WO | WO2007122030 | A1 | 11/2007 |

OTHER PUBLICATIONS

Siemens, AG, "High Performance Co-Operative Cluster Computing Through Migration of Jobs or Computing Nodes", IP.Com, Technical Disclosure, Document No. IPCOM000212445D, Nov. 14, 2011, pp. 1-8.
English translation of CN101727629 dated Jun. 9, 2010.
English translation of CN1487435 dated Apr. 7, 2004.
Chinese Office Action dated Feb. 19, 2016, pp. 9, for Serial No. 201310345015.7, filed Aug. 9, 2013.
U.S. Appl. No. 13/571,075, filed Aug. 9, 2012 (18.446).
Preliminary Amendment dated Aug. 9, 2012 for U.S. Appl. No. 13/571,075, filed Aug. 9, 2012 (18.446).
Notice of Allowance dated Feb. 17, 2015, pp. 7, for U.S. Appl. No. 13/571,075, filed Aug. 9, 2012 (18.446).
US Continuation U.S. Appl. No. 13/571,670, filed Aug. 10, 2012 (18.446C1).
Preliminary Amendment dated Aug. 10, 2012 for U.S. Appl. No. 13/571,670, filed Aug. 10, 2012 (18.446C1).
Notice of Allowance dated Jun. 9, 2014, pp. 16, for U.S. Appl. No. 13/571,670, filed Aug. 9, 2012 (18.446C1).
Notice of Allowance dated Oct. 27, 2014, pp. 7, for U.S. Appl. No. 13/571,670, filed Aug. 9, 2012 (18.446C1).
Notice of Allowance dated Feb. 20, 2015, pp. 7, for U.S. Appl. No. 13/571,670, filed Aug. 9, 2012 (18.446C1).
US Continuation U.S. Appl. No. 14/325,950, filed Jul. 8, 2014 (18.446C2).
Preliminary Amendment filed Jul. 8, 2014, pp. 9, for U.S. Appl. No. 14/325,950, filed Jul. 8, 2014 (18.446C2).
Office Action dated Mar. 16, 2016, pp. 41, for U.S. Appl. No. 14/325,950, filed Jul. 8, 2014 (18.446C2).
Response dated Jun. 16, 2016, pp. 13, to Office Action dated Mar. 16, 2016, pp. 41, for U.S. Appl. No. 14/325,950, filed Jul. 8, 2014 (18.446C2).
Final Office Action dated Aug. 5, 2016, pp. 31, for U.S. Appl. No. 14/325,950, filed Jul. 8, 2014 (18.446C2).
AFCP Response dated Oct. 5, 2016, pp. 13, to Final Office Action dated Aug. 5, 2016, pp. 31, for U.S. Appl. No. 14/325,950, filed Jul. 8, 2014 (18.446C2).
RCE Amendment dated Nov. 7, 2016, pp. 13, for U.S. Appl. No. 14/325,950, filed Jul. 8, 2014 (18.446C2).
Office Action dated Dec. 2, 2016, pp. 26, for U.S. Appl. No. 14/325,950, filed Jul. 8, 2014 (18.446C2).
Response dated Mar. 2, 2017, pp. 14, to Office Action dated Dec. 2, 2016, pp. 26, for U.S. Appl. No. 14/325,950, filed Jul. 8, 2014 (18.446C2).
Notice of Allowance dated Apr. 27, 2017, pp. 16, for U.S. Appl. No. 14/325,950, filed Jul. 8, 2014 (18.446C2).
US Continuation U.S. Appl. No. 14/328,322, filed Jul. 10, 2014 (18.446C3).
Preliminary Amendment filed Jul. 10, 2014, pp. 17,for U.S. Appl. No. 14/328,322, filed Jul. 10, 2014 (18.446C3).
Office Action dated Mar. 17, 2016, pp. 46, for U.S. Appl. No. 14/328,322, filed Jul. 10, 2014 (18.446C3).
Response dated Jun. 17, 2016, pp. 20, to Office Action dated Mar. 17, 2016, pp. 46, for U.S. Appl. No. 14/328,322, filed Jul. 10, 2014 (18.446C3).
Final Office Action dated Aug. 5, 2016, pp. 32, for U.S. Appl. No. 14/328,322, filed Jul. 10, 2014 (18.446C3).
AFCP Response dated Oct. 5, 2016, pp. 20, to Final Office Action dated Aug. 5, 2016, pp. 32, for U.S. Appl. No. 14/328,322, filed Jul. 10, 2014 (18.446C3).
RCE Amendment dated Nov. 7, 2016, pp. 20, for U.S. Appl. No. 14/328,322, filed Jul. 10, 2014 (18.446C3).
Office Action dated Nov. 22, 2016, pp. 27, for U.S. Appl. No. 14/328,322, filed Jul. 10, 2014 (18.446C3).
Response dated Feb. 22, 2017, pp. 21, to Office Action dated Nov. 22, 2016, pp. 27, for U.S. Appl. No. 14/328,322, filed Jul. 10, 2014 (18.446C3).
Notice of Allowance dated May 2, 2017, pp. 23, for U.S. Appl. No. 14/328,322, filed Jul. 10, 2014 (18.446C3).
U.S. Appl. No. 13/571,102, filed Aug. 9, 2012 (18.454).
Preliminary Amendment dated Aug. 9, 2012 for U.S. Appl. No. 13/571,102, filed Aug. 9, 2012 (18.454).
Office Action dated Dec. 10, 2014, pp. 20, for U.S. Appl. No. 13/571,102, filed Aug. 9, 2012 (18.454).
Response dated Mar. 10, 2015, 11, to Office Action dated Dec. 10, 2014, pp. 20, for U.S. Appl. No. 13/571,102, filed Aug. 9, 2012 (18.454).
Final Office Action dated Jul. 16, 2015, pp. 27, for U.S. Appl. No. 13/571,102, filed Aug. 9, 2012 (18.454).
Response dated Sep. 16, 2015, pp. 12, to Final Office Action dated Jul. 16, 2015, pp. 27, for U.S. Appl. No. 13/571,102, filed Aug. 9, 2012 (18.454).

(56) References Cited

OTHER PUBLICATIONS

Response dated Oct. 21, 2015, pp. 9, to Final Office Action dated Jul. 16, 2015, pp. 27, for U.S. Appl. No. 13/571,102, filed Aug. 9, 2012 (18.454).
Notice of Allowance dated Nov. 17, 2015, pp. 11, for U.S. Appl. No. 13/571,102, filed Aug. 9, 2012 (18.454).
Notice of Allowance dated Jul. 12, 2016, pp. 12, for U.S. Appl. No. 13/571,102, filed Aug. 9, 2012 (18.454).
Notice of Allowance dated Nov. 7, 2016, pp. 12, for U.S. Appl. No. 13/571,102, filed Aug. 9, 2012 (18.454).
Notice of Allowance dated Feb. 9, 2017, pp. 12, for U.S. Appl. No. 13/571,102, filed Aug. 9, 2012 (18.454).
US Continuation U.S. Appl. No. 13/571,760, filed Aug. 10, 2012 (18.454C1).
Preliminary Amendment dated Aug. 10, 2012 for U.S. Appl. No. 13/571,760, filed Aug. 10, 2012 (18.454C1).
Office Action dated Dec. 12, 2014, pp. 29, for U.S. Appl. No. 13/571,760, filed Aug. 10, 2012 (18.454C1).
Response dated Mar. 12, 2015, pp. 18, to Office Action dated Dec. 12, 2014, pp. 29, for U.S. Appl. No. 13/571,760, filed Aug. 10, 2012 (18.454C1).
Final Office Action dated Jul. 21, 2015, pp. 34, for U.S. Appl. No. 13/571,760, filed Aug. 10, 2012 (18.454C1).
Response dated Sep. 21, 2015, pp. 18, to Final Office Action dated Jul. 23, 2015, pp. 34, for U.S. Appl. No. 13/571,760, filed Aug. 10, 2012 (18.454C1).
Response dated Oct. 20, 2015, pp. 14, to Final Office Action dated Jul. 23, 2015, pp. 34, for U.S. Appl. No. 13/571,760, filed Aug. 10, 2012 (18.454C1).
Supplemental Response dated Oct. 21, 2015, pp. 12, to Final Office Action dated Jul. 23, 2015, pp. 34, for U.S. Appl. No. 13/571,760, filed Aug. 10, 2012 (18.454C1).
Notice of Allowance dated Nov. 20, 2015, pp. 11, for U.S. Appl. No. 13/571,760, filed Aug. 10, 2012 (18.454C1).
Notice of Allowance dated Mar. 22, 2016, pp. 12, for U.S. Appl. No. 13/571,760, filed Aug. 10, 2012 (18.454C1).
Notice of Allowance dated Jul. 14, 2016, pp. 12, for U.S. Appl. No. 13/571,760, filed Aug. 10, 2012 (18.454C1).
Notice of Allowance dated Oct. 21, 2016, pp. 11, for U.S. Appl. No. 13/571,760, filed Aug. 10, 2012 (18.454C1).
Notice of Allowance dated Feb. 9, 2017, pp. 11, for U.S. Appl. No. 13/571,760, filed Aug. 10, 2012 (18.454C1).
Information Materials for IDS dated Feb. 19, 2016, for Chinese Office Action dated Feb. 19, 2016, pp. 9, for Serial No. 201310345015.7.
Notice of Allowance dated Jun. 9, 2014, pp. 16, for U.S. Appl. No. 13/571,075, filed Aug. 9, 2012 (18.446).
Notice of Allowance dated Nov. 7, 2014, pp. 7, for U.S. Appl. No. 13/571,075, filed Aug. 9, 2012 (18.446).
Notice of Allowance dated Mar. 8, 2016, pp. 12, for U.S. Appl. No. 13/571,102, filed Aug. 9, 2012 (18.454).

\* cited by examiner

SERVICE MANAGEMENT MODES OF OPERATION IN DISTRIBUTED NODE SERVICE MANAGEMENT

RELATED APPLICATIONS

This application is related to application entitled "Service Management Modes of Operation in Distributed Node Service Management", filed Aug. 9, 2012, now issued as U.S. Pat. No. 9,678,801, assigned to the assignee of the present application, and incorporated by reference in its entirety and copending application entitled "Service Management Modes of Operation in Distributed Node Service Management", filed Aug. 10, 2012, now issued as U.S. Pat. No. 9,678,802.

TECHNICAL FIELD

This description relates in general to distributed computing systems, and more particularly, to a method, system and program product for facilitating servicing and coordination of a distributed computing system.

BACKGROUND

In order to provide for high-throughput of work, or nearly continuous availability, distributed computing systems are often utilized. A distributed computing system typically includes two or more computing devices which frequently operate somewhat autonomously and communicate with each other over a network or other communication path.

A computing device of a distributed system that has the capability of sharing resources is often referred to as a cluster which has two or more nodes, each node having a processor or at least a processor resource, and typically, a separate operating system. One example of a distributed computing system utilizing one or more clusters is the IBM System Storage TS7650G ProtecTIER Deduplication Gateway, which provides functions, such as a virtual tape library which appears to applications as one automated tape library. The distributed computing system of the TS7650G also usually includes several controllers which communicate with the clusters over a network.

FIG. 1 shows an example of a distributed computing system 100 having cluster computing devices 102, 104, one or more single node computing devices 106 and a system or service console 110 which provides a central point of service for a distributed computing system having multiple computing devices such as ProtecTIER systems. The computing devices 102, 104, 106 and the service console 110 are typically linked together by a network 112 which may be a network internal to the distributed computing system, for example.

The service console may have an outbound connection 114 to connect to a support center 120. Such a connection 114 may be made, for example, over a broadband Ethernet connection that includes an intranet 115, a firewall 116 and the internet 118, for example.

The service console may also have another connection 122 which may be a modem connection, for example, to the support center 120.

In a clustered configuration such as that found in the cluster 102, two processor nodes 124 are usually both active, (often referred to as "active-active" operation), to provide access to the same data set. A network 130 internal to the cluster may be used to provide communication between the two processor nodes of the cluster 102.

The distributed computing system 100 may further include a workstation 134 which is connected to each of the computing devices 102, 104, 106 over a network 136, such as a user network for example. A suitable manager program, such as ProtecTIER Manager for example, may be run on the workstation 134 to provide configuration and monitoring access to each of the computing devices 102, 104, 106. In addition, one or more keyboard, video, and monitor (KVM) interfaces 140 may be provided for the processor nodes 124 of the computing devices 102, 104, 106 as well as the service console 110 to provide local access. The KVM interfaces 140 may be shared among one or more of the processor nodes 124 of the computing devices 102, 104, 106 and the service console 110 through a suitable KVM switch.

The service console 110 facilitates access by a remote support center 120 to the service console 110 as well as to the individual computing devices 102, 104, 106. Conversely, the service console 110 facilitates access by the computing devices 102, 104, 106 to provide error or other service notifications to the remote support center 120. For example if a processor node 124 of the cluster 102 encounters an error, it may generate an error notification (often referred to as a "call home request" or a "message offload request") and send the call home request to the service console 110. The service console 110 in turn forwards the error notification and any associated error data (often referred to as a call home package) such as a core dump to a remote support center 120. In addition, service personnel at the support center 120 may log into the service console 110 to remotely access the computing devices 102, 104, 106 attached to a service console 110. In some installations, a service console such as the service console 110 may have software which provides a web browser and other graphical user interfaces to facilitate local or remote monitoring and management of the distributed computing system.

Some distributed computing systems lack a system or service console such as the service console 110. Accordingly, such distributed computing systems typically do not have a consolidated, centralized point of management for service or coordination among multiple processor nodes at a user site. In such distributed computing systems lacking a service console or the centralized point of management, each computing device of the distributed computing system may have its own separate internet or modem connection to connect to a support center.

SUMMARY

In one aspect of the present description, operations are described for both performing data processing functions at each of a plurality of processor nodes including performing data processing functions at a first processor node in a first data processing role, in a distributed computing system having the plurality of processor nodes, and for selecting a first mode of operation of a distributed node service management system by the plurality of processor nodes in the distributed computing system including the first processor node. Operations further include, in response to selection of a first mode of operation of the distributed node service management system, configuring the first processor node to also perform distributed node service management in a first distributed node service management role as a function of the selected first mode of operation, wherein the distributed node service management in the first distributed node service management role at the first processor node includes processing a service request for servicing the distributed computing system.

In another aspect, the first processor node is configured to perform distributed node service management in a master distributed node service management role which includes joining additional processor nodes in the distributed computing system to the distributed node service management system. In addition, performing distributed node service management by the first processor node in the master distributed node service management role may further include providing a join lock to a second processor node to prevent other processor nodes from joining the distributed node service management system while the second processor node has the join lock.

In yet another aspect, performing distributed node service management by the first processor node in the master distributed node service management role further includes qualifying a second processor node to determine if the second processor node is qualified to join the distributed node service management system before joining the second processor node to the distributed node service management system. In still another aspect, the qualifying second processor node to determine if the second processor node is qualified to join the distributed node service management system, may be a function of a comparison of versions of at least one of hardware and software maintained at the second processor node, relative to versions of at least one of hardware and software maintained at other processor nodes previously joined to the distributed node service management system.

In another aspect, the joining additional processor nodes in the distributed computing system to the distributed node service management system includes assigning a distributed node service management role to a processor node joining the distributed node service management system. In still another aspect, the distributed node service management role assigned to a processor node joining the distributed node service management system may be a function of preselected user preferences.

In yet another aspect, the distributed node service management role assigned to a processor node joining the distributed node service management system may be one of a master, standby, and member distributed node service management role. In another aspect, the distributed node service management role assigned to a processor node joining the distributed node service management system may be a function of preselected user preferences.

In still another aspect, the distributed node service management role assigned to a processor node joining the distributed node service management system is one of a master, standby, and member distributed node service management role and is a function of a preselected user preference that the number of processor nodes operating in a standby distributed node service management role meet or exceed a preselected percentage of the total processor nodes joined to the distributed node service management system.

In another aspect, the distributed computing system comprises clusters in which each cluster includes one or more of the plurality of processor nodes of the distributed computing system, and wherein the distributed node service management role assigned to a processor node joining the distributed node service management system is one of a master, standby, and member distributed node service management role and is a function of a preselected user preference that each cluster of the distributed computing system have at least one processor node perform distributed node service management in a standby distributed node service management role.

In still another aspect, the distributed node service management role assigned to a processor node joining the distributed node service management system is selected by a user. In yet another aspect, the first processor node performing distributed node service management in the master distributed node service management role further includes obtaining a network IP address for addressing the first processor node within a network providing communication paths among the processor nodes in the distributed computing system. In another aspect, the distributed node service management role assigned to a processor node joining the distributed node service management system is a function of capabilities of the processor node joining the distributed node service management system. In yet another aspects, operations further comprise, in response to the selection of a first mode of operation of the distributed node service management system, configuring additional processor nodes of the distributed computing system to also perform distributed node service management in distributed node service management roles as a function of the selected first mode of operation, wherein the configuring of processor nodes is performed independently of data processing functions at the processor nodes being configured so that the data processing functions at the processor nodes being configured are not disrupted by the configuring of the processor nodes to perform distributed node service management. In still another aspect, operations further comprise selecting a second mode of operation of a distributed node service management system by the plurality of processor nodes in the distributed computing system, and in response to the selection of the second mode of operation of the distributed node service management system, reconfiguring processor nodes of the distributed computing system to perform distributed node service management in distributed node service management roles as a function of the selected second mode of operation, wherein the reconfiguring of processor nodes is performed independently of data processing functions at the processor nodes being reconfigured so that the data processing functions at the processor nodes being reconfigured are not disrupted by the reconfiguring of the processor nodes to perform distributed node service management. In another aspect, operations further comprise, in response to the selection of the first mode of operation of the distributed node service management system, configuring additional processor nodes of the distributed computing system to also perform distributed node service management in a first distribution of distributed node service management roles as a function of the selected first mode of operation and to provide redundancy in the distributed node service management roles, and in response to a loss of redundancy in the distributed node service management roles, reconfiguring processor nodes of the distributed computing system to perform distributed node service management in a second distribution of distributed node service management roles as a function of the selected first mode of operation and to restore redundancy in the distributed node service management roles. In still another aspect, operations further comprise, in response to the selection of the first mode of operation of the distributed node service management system, configuring selected additional processor nodes of the distributed computing system to also perform distributed node service management in distributed node service management role which includes a health check function to detect errors in connection with the distributed node service management operations of other processor nodes of the distributed computing system, wherein the health check function includes sending a request message to each active node in the distributed computing system to determine their current operational status, and wherein any of the plurality of processor nodes in the distributed computing system may be selected to perform distributed node service management in a distributed node service management role which includes the health check function and wherein the configuring of processor nodes is performed independently of data processing functions at the processor nodes being configured so that the data processing functions at the processor nodes being configured are not disrupted by the configuring of the processor nodes to perform distributed node service management.

Other features and aspects may be realized, depending upon the particular application.

DETAILED DESCRIPTION

Figure 1:
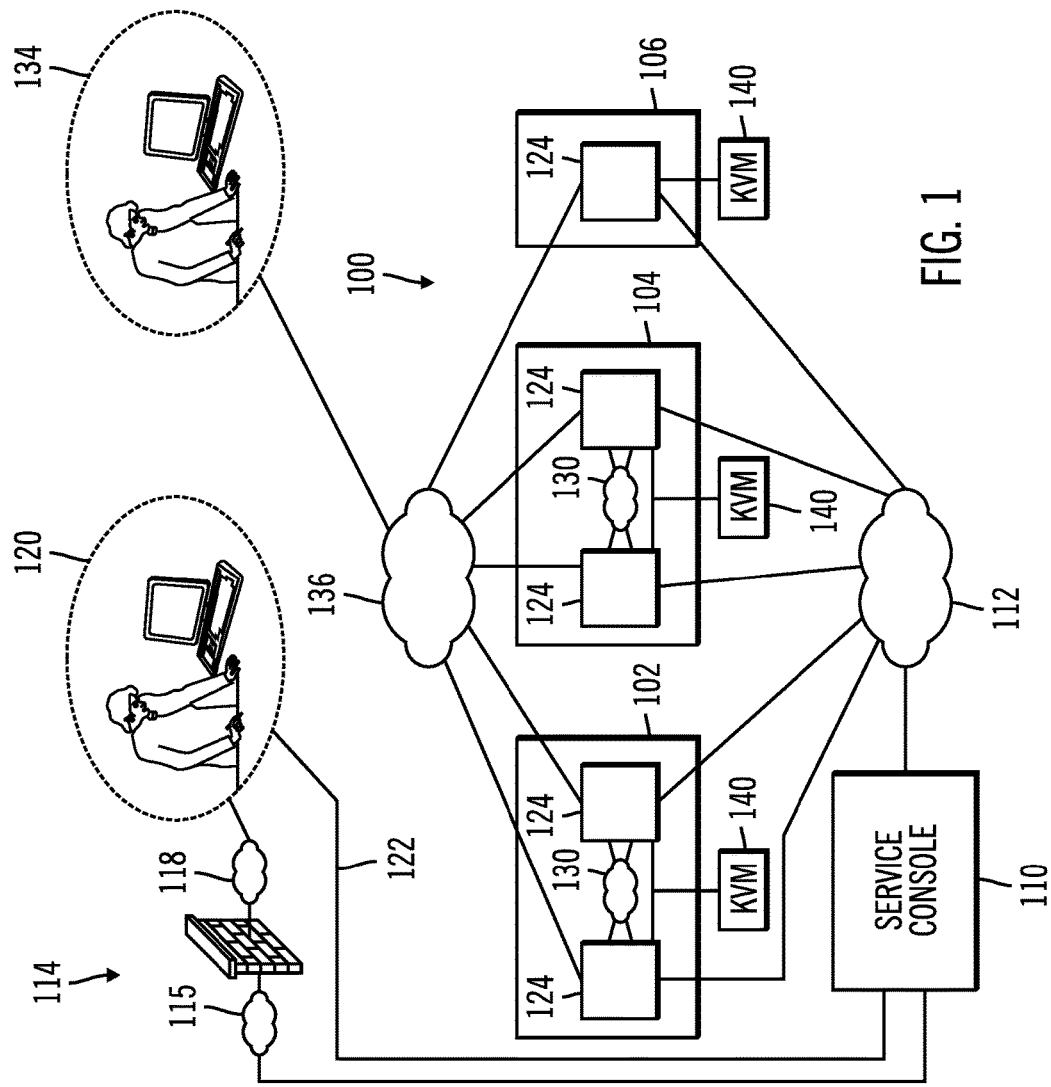
FIG. 1 illustrates a prior art computing environment employing a distributed computing system.
Figure 2:
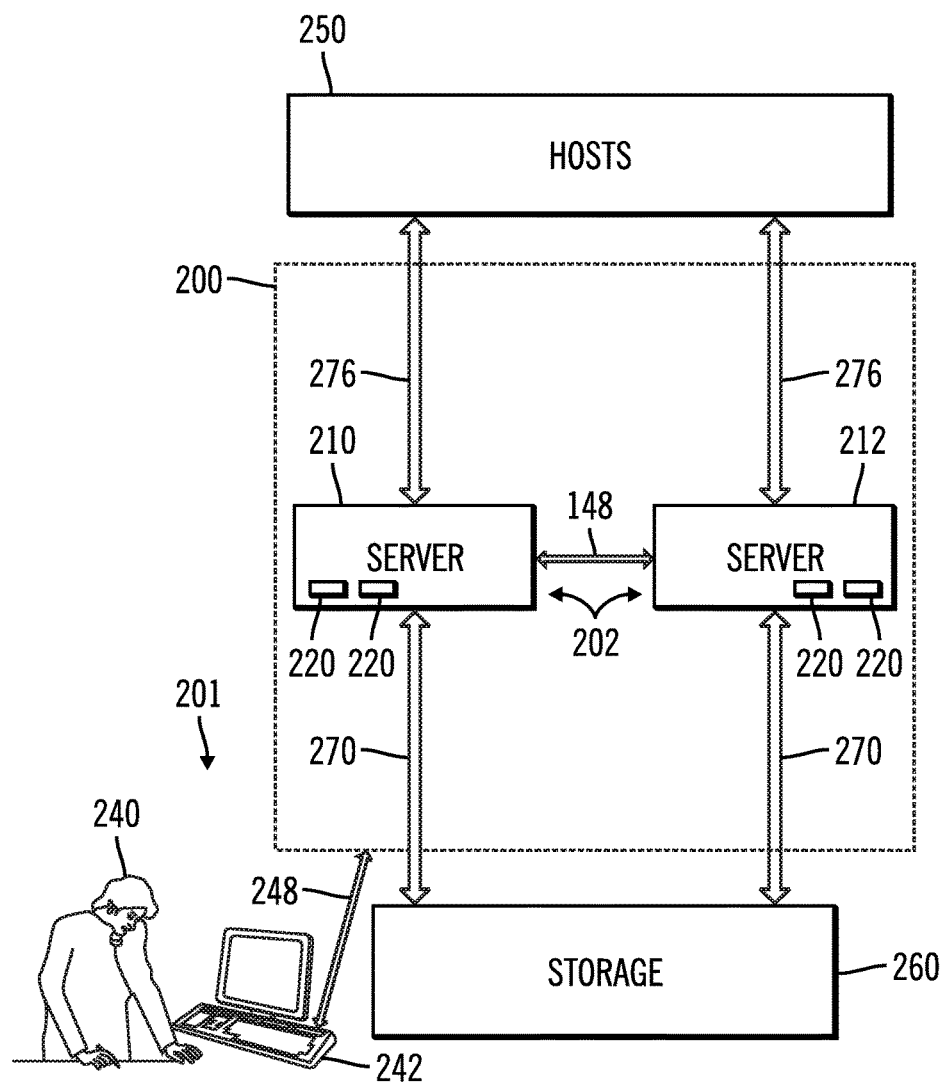
FIG. 2 illustrates an example of a computing environment having a distributed computing system employing a distributed node service management system in accordance with one aspect of the present description.

One example of a distributed computing system incorporating and using aspects of a distributed node service management system in accordance with one embodiment of the present description, is depicted at 200 in FIG. 2 and described herein. A distributed computing system in accordance with the present description may include a plurality of processor nodes, which may be provided by various computing devices including clusters, controllers and other programmed or dedicated processors. The primary function of the distributed computing system is to provide a data processing function such as data backup, data retrieval, data deduplication, data mining, data capture, data archiving, data replication, bandwidth reduced data replication, encryption of data etc.

In one aspect of the present description, a distributed node service management system which utilizes multiple existing processor nodes of the distributed computing system, is provided in support of the primary data processing functions of the distributed computing system. The distributed node service management system coordinates and manages service functions on behalf of processor nodes of the distributed computing system. For example, a processor node of the distributed node service management system may manage the sending of error notifications or other service to a remote support center, such as the remote support center 201.

As explained in greater detail below, a distributed node service management system in accordance with the present description may reduce or eliminate the need for the separate hardware of a service console for sending service notifications to a remote support center. Instead, the distributed node service management system may operate on the processor nodes of the distributed computing system which are already in place and performing the primary data processing function of the distributed computing system.

In another aspect, many of the functions of the distributed node service management may be centralized in as few as one processor node of the distributed computing system. As a result, the use of a separate internet or modem connection, for example, for each computing device of the distributed computing system to connect to a support center, may be reduced or eliminated.

In another aspect of the present description, a processor node of a distributed node service management system in accordance with the present description may provide additional service functions including providing remote access to computing devices of the distributed computing system, monitoring the health of computing devices and associated network infrastructure of the distributed computing system, and providing local access to computing devices of the distributed computing system. Other service functions may be provided as well, depending upon the particular application.

Furthermore, in one embodiment, a distributed node service management system in accordance with the present description may be dynamically configured according to different user environments or requirements while still providing a centralized point of service for multiple computing devices of a distributed computing system. For example, users may configure different service operational modes of the distributed node service management system where the manner in which service functions are handled in a particular mode may vary. Thus different operational modes may be provided to coordinate error or other service notifications, failure recovery, and health checks in a different manner, depending upon the mode or modes selected and configured. Moreover, in one embodiment, a user can initiate a change from one distributed node service management mode of operation to another while the primary data processing functions of the processor nodes remain online and not disrupted by the change of operational mode of the distributed node service management system.

In another aspect, a distributed node service management system in accordance with the present description may assign different distributed node service management roles to each processor node of the distributed node service management system, depending upon the current mode of operation of the distributed node service management system. For example, as explained in greater detail below, in some modes of operation, processor nodes may be assigned different roles of operation which include for example, a master active role, a standby role and a member role, depending upon the current mode of operation. Furthermore, in the event of an error, the distributed node service management system can failover distributed node service management functions from one processor node to another while the primary data processing functions of the processor nodes remain online and not disrupted by the change of operational role of a processor node of the distributed node service management system.

In the example of FIG. 2, the distributed computing system 200 includes a cluster 202 having two servers, a server 210 and a server 212, each of which may include one or more processor nodes 220 which share resources and collaborate with each other in performing system tasks. Although one cluster 202 and two servers 210, 212 are depicted in the illustrated embodiment, it is appreciated that the distributed computing system 200 may have a fewer or a greater number of clusters and servers, depending upon the particular application.

Each server 210, 212 may have one or more central processing units (CPUs) in which the processing, memory and other resources of the server may be apportioned into logical partitions, often referred to as a "virtual server," each of which is capable of running an individual copy of an operating system and performing the service functions of a "server". Thus, as used herein, the term "server" may be used to refer to a physical server or a logical partition or virtual server performing a server function.

Each processor node 220 typically includes a virtual or physical server having processor and memory resources running an individual copy of an operating system. Hence, each processor node 220 is capable of independently performing data processing functions as well as distributed node service management functions assigned to that processor node.

A server may have multiple I/O adapters including host and device adapters which are accessed through a switch such as a PCIe switch, for example. To increase efficiency, it is often desirable to share I/O adapters amongst the servers of the cluster. Thus, a device adapter, for example, may be shared as a "virtual" device adapter. The servers typically communicate with the device adapters and other I/O adapters over a "fabric" which may comprise one or more interfaces providing communication paths between the servers and adapters.

In the illustrated embodiment, the server 210 and the server 220 are each depicted as having two processor nodes 220, for example. It is appreciated that the number of processor nodes 220 in each server 210, 212 may vary, depending upon the particular application.

A service technician 240 or other human operator of the service center 201 may access a processor node 220 of the servers 210, 212 using a distributed node service management system in accordance with the present description which includes a management system program or other software running one or more processor nodes 220 of the distributed computing system 200. Additional software compatible with the distributed node service management system, such a web browser, for example run on a workstation 242 of the service center 201 which may be remotely located or may be at the same locale as one or more components of the distributed computing system 200. Communication paths 248 interconnect the various processor nodes 220 of the distributed computing system 200 and also the workstation 242. The communication paths 248 may be part of an Ethernet network, for example, such that each processor node 220 has an individual network (internet protocol) address. Other types of networks or other communication paths may be utilized, such as a modem telephone path, wireless network, etc. depending upon the particular application.

In the illustrated embodiment, the service technician 240 may be logged into a first processor node 220 of a server 210, 212, for example, to monitor that particular processor node. The service technician may be logged into the processor node in response to receipt of a call home request from a processor node 220 of the distributed computing system 200, for example. Alternatively, the service technician may be logged into a particular processor node to monitor operations of that processor node as part of scheduled maintenance or other operations, for example.

In the illustrated embodiment, the distributed computing system 200 may include, for example, a virtual tape library which appears to applications running on one or more hosts 250 as one automated tape library. Thus, the distributed computing system 200 may include, for example, a virtual tape library such as an IBM System Storage TS7650 ProtecTIER Deduplication Gateway for System z. It is appreciated that a distributed computing system in accordance with the present description may have other primary data processing applications, such as storage controllers, for example. The distributed computing system 200 may further provide, for example, additional data processing functions such as network protocols such as the Common Internet File System (CIFS) network protocol which is also known as the Server Message Block (SMB) protocol. A common use of this protocol is to provide for sharing files on a Local Area Network (LAN). Using this protocol, a client may manipulate files stored on a remote server as if the files were stored on a local computer. The file manipulations include operations such as read, write, create, delete, and rename, for example. Other data processing functions provided by the distributed computing system 200 may include interfaces to other backup systems such as Netbackup Open Storage (OST), for example. Other distributed computing systems may be realized, depending upon the particular application.

An IBM System Storage TS7650G ProtecTIER Deduplication Gateway in a typical installation, has a single cluster which includes two physical servers, each physical server having a processor node.

The servers of the TS7650G permit magnetic storage tape processing applications running on the hosts to access virtual robots to move virtual cartridges while the servers actually store data on one or more virtual volumes of a storage fabric represented by one or more disk storage devices 260. The storage fabric includes suitable communication paths 270 between the storage devices 260 of the storage fabric and the servers 210, 212. The storage fabric may include suitable switches and other fabric devices.

The hosts 250 are coupled to the distributed computing system 200 by communication paths 276 of a network fabric. The network fabric may similarly include suitable switches and other fabric communication devices.

In the illustrated embodiment, the servers 210, 212 provide an interface between the communication paths 276 coupled to the hosts 250, and communication paths 270 between the storage devices 260 of the storage fabric and the servers 210, 212. Thus, the communication paths 276 to the hosts 250 may be based upon a particular host attachment protocol such as FICON, for example, and the communication paths 270 may be based upon the Fibre Channel protocol, for example. It is appreciated that other communication path protocols may be utilized, depending upon the particular application.

Figure 3:
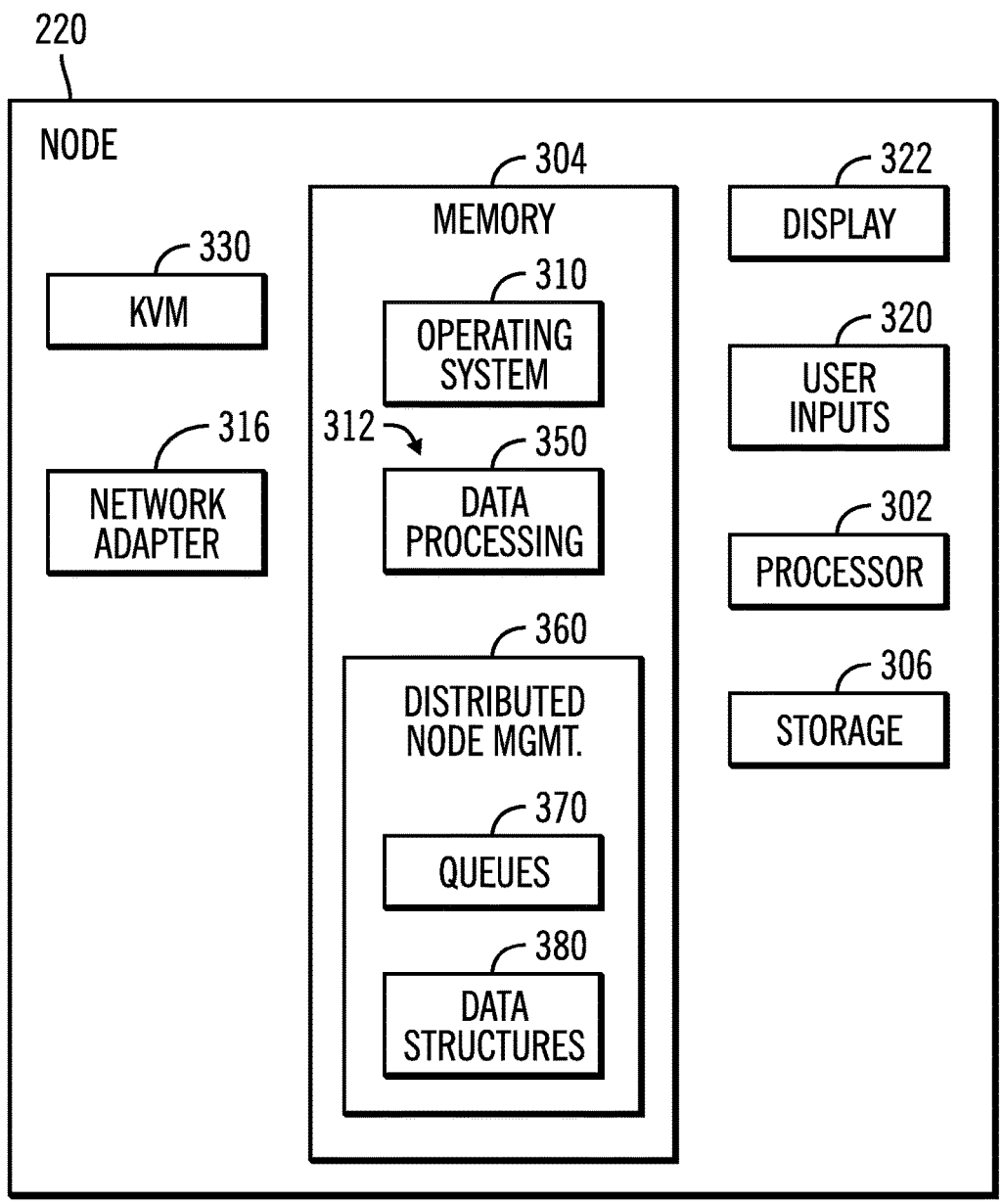
FIG. 3 illustrates an example of a processor node of the distributed computing system for use in connection with the distributed node service management system of FIG. 2.

FIG. 3 illustrates one embodiment of a processor node 220 of the distributed computing system 200. The processor node 220 may comprise any suitable computing device, such as a mainframe, server, personal computer, laptop, handheld computer, telephony device, network appliance, virtualization device, storage controller, etc. The processor node 220 may include a processor 302 (e.g., a microprocessor), a memory 304 (e.g., a volatile memory device), and storage 306 (e.g., a non-volatile storage, such as magnetic disk drives, optical disk drives, a tape drive, etc.). The storage 306 may comprise an internal storage device or an attached or network accessible storage. Programs in the storage 306 are loaded into the memory 304 and executed by the processor 302 as represented by an operating system 310 and programs 312. The processor node 220 further includes a network controller or adapter 316 to enable communication with a network such as the network 248 (FIG. 2), such as an Ethernet, a Fibre Channel Arbitrated Loop, etc. which interconnects the processor nodes of the distributed computing system 200. The network controller or adapter 316 may also enable communication with a network path 276 to a host 250 or with a network path 270 to storage 260.

User input devices 320 provide user input to the processor 302, and may include a keyboard, mouse, pen-stylus, microphone, touch sensitive display screen, or any other suitable activation or input mechanism. Output devices 322 are capable of rendering information transmitted from the processor 302, or other component, such as a display monitor, printer, storage, etc. The input devices 320, and output devices 322 may be coupled directly to a processor node using a suitable KVM (keyboard, video, mouse) switch 330 in some applications.

In one embodiment, the processor nodes 220 of each of the servers 210, 212 of the distributed computing system 200 perform a primary data processing function such as the functions of a virtual tape library such as an IBM System Storage TS7650G ProtecTIER Deduplication Gateway. Thus, included in the memory 304 is suitable data processing programming 350 for performing the data processing functions such as virtual tape library functions, for example. It is appreciated that the processor nodes 220 of a distributed computing system may perform other data processing functions such as data storage and management in disk arrays, for example. Thus, the processor nodes 220 may perform data processing tasks such as data backup, data deduplication, data mining, data capture, data archiving data replication, bandwidth reduced data replication, encryption of data, etc., and typically involve the transfer of large amounts of data between the hosts 250 and storage 260.

In accordance with the present description, each processor node 220 further has distributed node service management programming 360 which may share some or all of the hardware and software resources of the particular processor node 220. As explained in greater detail below, one or more such processor nodes 220 in running the distributed node service management programming 360, may act as a "service proxy", for example, to provide primary distributed node service management functions on behalf of other processor nodes of the distributed computing system 200, including providing remote support center connectivity for multiple processor nodes 220 and forwarding error or other service notifications to the remote support center for multiples processor nodes 220. As explained in greater detail below, the processor nodes 220 may perform other distributed node service management roles in the distributed node service management system.

Since the distributed node service management functions provided by the programming 360 may share hardware and software resources of the particular processor node 220 with the primary data processing functions provided by the data processing programming 350, distributed node service management in accordance with the present description may reduce or eliminate use of an external server or service console to provide a centralized point of service. In addition, protection may be provided against a single point of failure. For example, and as explained in greater detail below, users may optionally configure the distributed node service management system to automatically redistribute distributed node service management service redundancy in the event of a processor node failure.

Each processor node may further have one or more distributed node service management queues 370 including outgoing and incoming queues for sending service related messages and receiving service related messages, respectively, between the processor nodes 220. Examples of such service related messages include service notifications including error notifications, call home requests and call home packages.

Also, each processor node 220 may have data structures 380 for storing a local copy of distributed node service management information. Examples of such information may include identification of the mode of operation of the distributed node service management system, the network address of each processor node in the distributed node service management system and the role each processor node is performing within the identified distributed node service management mode of operation. Other information may be included, depending upon the particular application.

In one aspect of the present description, the data processing programming 350 for performing the data processing functions such as virtual tape library functions, for example, operates substantially independently of the distributed node service management programming 360, which provides distributed node service management functions on behalf of one or more processor nodes of the distributed computing system 200. Thus, for example, a software failure or shut down in the data processing functions provided by the data processing programming 350 at a particular processor node 220 may not interfere with distributed node service management functions at the same processor node 220. Conversely, a software failure or shutdown in the distributed node service management functions at a particular processor node may not interfere with the data processing functions provided by the data processing programming 350 at the same processor node 220. Both data processing functions and distributed node service management functions will continue to operate independently of failures or shutdowns in the other so long as the failure or shutdown does not involve hardware or software needed by both the data processing functions and the distributed node service management functions at the processor node.

Figure 4:
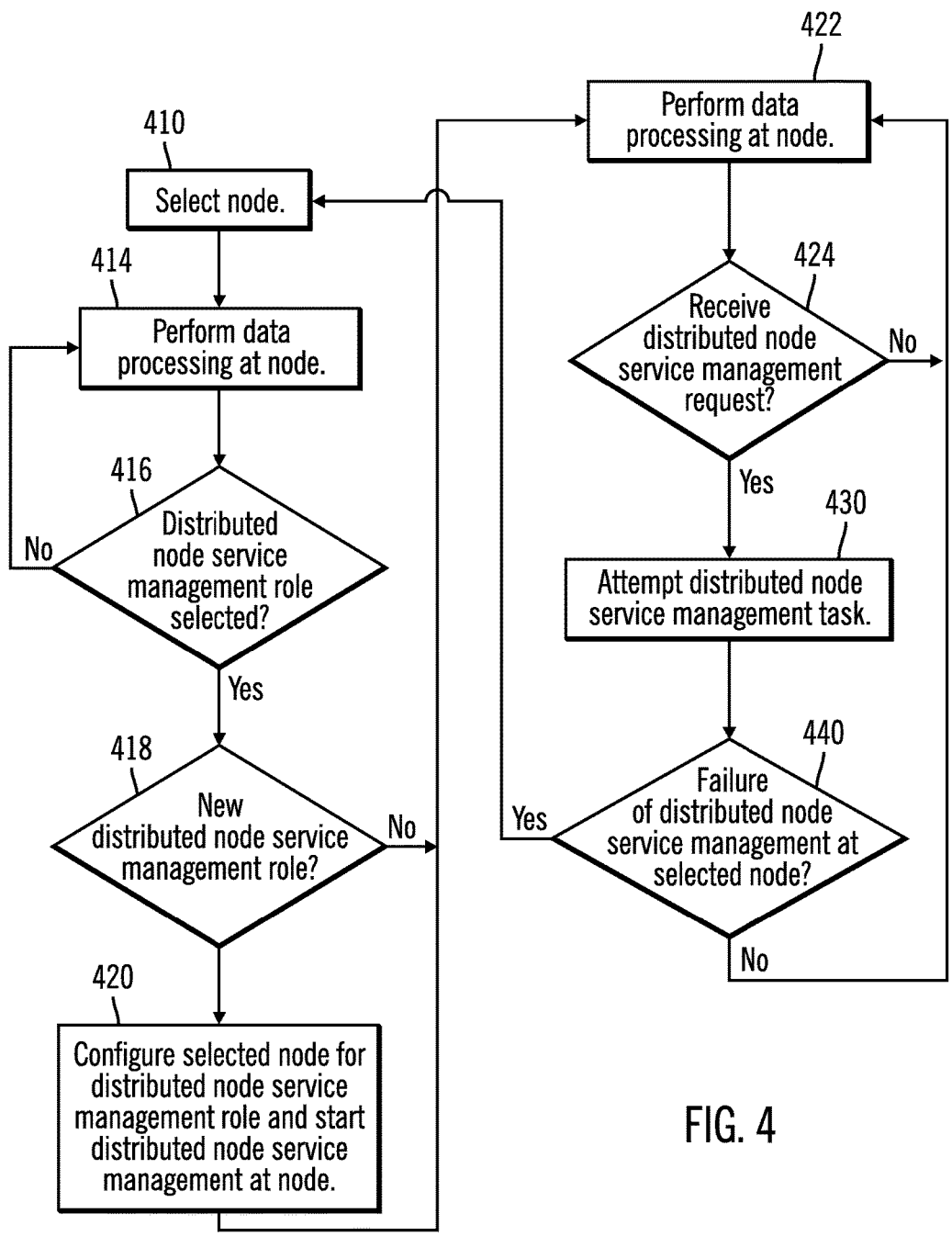
FIG. 4 depicts an example of operations for distributed node service management in accordance with one aspect of the present description.

FIG. 4 depicts one example of operations for distributed node service management in accordance with one embodiment of the present description. In a first operation, a processor node is selected (block 410) to perform distributed node service management such as the service proxy functions, for example. In one embodiment, the processor node may be selected manually by the user. In another embodiment, the processor node may be selected automatically. As explained in greater detail below, distributed node service management in accordance with one aspect of the present description may have various configurations and modes of operations which may affect the manner in which a processor node is selected.

As previously mentioned, data processing functions such as data storage functions provided by the data processing programming 350 may be performed (block 414) at the selected processor node independently of distributed node service management at the selected processor node. Accordingly, in another operation, a determination is made as to whether a distributed node service management role has been selected (block 416) at the particular processor node. If not, the data storage functions provided by the data processing programming 350 may continue to be performed (block 414) at the particular processor node, but without distributed node service management being also performed at that processor node of the distributed computing system.

If a distributed node service management role has been selected (block 416) at the particular processor node, a determination is made as to whether the selected distributed node service management role is newly selected (block 418). If so, the selected processor node is configured (block 420) for the newly selected distributed node service management role and distributed node service management may be started.

Data processing functions such as data storage functions provided by the data processing programming 350 may continue to be performed (block 422) at the selected node independently of the distributed node service management at the selected processor node. In performing distributed node service management at a processor node, the particular processor node may receive (block 424) a distributed node service management request. In one aspect of the present description, the distributed node service management may utilize the selected processor node to function as a service proxy for performing distributed node service management on behalf of other processor nodes of the distributed node service management system. Thus, a service proxy node in the distributed node service management system may coordinate and manage the sending of error or other service notifications to a remote support center, such as the remote support center 201, on behalf of other processor nodes of the distributed node service management system. Other service requests may relate to other service proxy functions including providing remote access to computing devices of the distributed computing system, monitoring the health of computing devices and associated network infrastructure of the distributed computing system, and providing local access to computing devices of the distributed computing system.

In another aspect of the present description, the distributed node service management may utilize the selected processor node to provide services for performing distributed node service management locally on behalf of that particular processor node of the distributed node service management system. Thus, a processor node in the distributed node service management system may coordinate and manage the sending of error notifications to a remote support center, such as the remote support center 201, on behalf of that processor node of the distributed computing system. Other service requests may relate to other service functions including providing remote access to that particular processor node of the distributed computing system, monitoring the health of that particular processor node and associated network infrastructure of the distributed computing system, and providing local access to that particular processor node of the distributed computing system.

Thus, a distributed node service management request may be generated locally in a particular processor node for response by that particular processor node, or may be generated by a particular processor node for sending to a different processor node of the distributed computing system for handling. Also, a distributed node service management request may be generated by a remote service center or by a local user. Service requests in connection with other service functions may be provided as well, depending upon the particular application.

In response to a service request (block 424), an attempt (block 430) is made to perform the appropriate distributed node service management task or tasks at the selected processor node. In the event of failure (block 440) of the distributed node service management system at the selected processor node in performing that task, another processor node may be selected (block 410), configured (block 420) and another attempt (block 430) is made to perform the appropriate distributed node service management task or tasks at the next selected processor node instead of at the originally selected processor node, in response to the distributed node service management request (block 424).

Absent failure at the originally selected processor node, distributed node service management is resumed at the originally selected processor node in the selected distributed node service management role awaiting (block 424) the next distributed node service request. However, in the event of failure (block 440) of the distributed node service management at the originally selected processor node, the original processor node may be selected again (block 410), and configured (block 420) in a different distributed node service management role which may be unlikely to fail for the same reasons that that the originally selected role may have failed. For example, if the failure related to an inability to contact the remote service center, distributed node management services in a role unrelated to contacting the remote service center may be successfully performed at that processor node.

As previously mentioned, distributed node service management in accordance with one aspect of the present description may have various modes of operations which may affect the manner in which a processor node is selected. One such mode referred to herein as "active-standby" mode permits a user to configure one of the processor nodes 220 as a master active node and one or more other active nodes 220 as standby processor nodes. The master active node of the processor nodes 220 may perform service proxy type distributed node service management functions including coordinating and managing the sending of error and other service notifications to a remote support center, such as the remote support center 201. Other service functions which may be performed by the master active node include providing remote access to computing devices of the distributed computing system, monitoring the health of computing devices and associated network infrastructure of the distributed computing system, and providing local access to computing devices of the distributed computing system. Other service functions may be provided by the master active node as well, depending upon the particular application.

In the event the master active node encounters an error (block 440) when performing a distributed node service management function such as sending a call home package to the service center, one or more of the service proxy functions of the distributed node service management may failover to a standby node to be performed by that standby node, according to the configuration set by the user or a default configuration. Upon completion of the failover operation, the standby node targeted by the failover operation is redesignated as the substitute master active node for those service functions which were subject to the failover operation. Thus, the substitute master active node may perform one or more of the service proxy distributed node service management functions including coordinating and managing the sending of error and other service notifications to a remote support center, such as the remote support center 201, providing remote access to computing devices of the distributed computing system, monitoring the health of computing devices and associated network infrastructure of the distributed computing system, and providing local access to computing devices of the distributed computing system.

The failover operation may be configured by the user to occur automatically upon detection of an error or may be configured to be performed manually by a user. The distributed node service management may be configured to select (block 410) a standby processor node as the target of the failover operation automatically or may be configured for manual selection by the user of a standby node as the failover target. Suitable candidates for automatic selection as failover target standby nodes may be designated in advance by the user. The standby node selected (block 410) as the target of the failover operation is configured (block 420) as the substitute master active node for those service proxy functions which were subject to the failover operation.

In the event the substitute master active node subsequently also encounters an error (block 440) when performing a service proxy distributed node service management function such as sending a call home package to the service center, the distributed node service management may failover to yet another standby node to perform one or more service proxy distributed node service management functions such as coordinating and sending call home packages, according to the configuration set by the user. This process may be repeated upon encountering subsequent additional failures until all standby nodes in a system have been exhausted according to the service strategy configured by the user. Thus, the distributed node service management system coordinates the failover to additional standby nodes in a serial fashion which can limit the outbound connections on the network.

In another aspect of the present description, the distributed node service management may include a mode of operation referred to herein as the "active-distributed standby" mode, which is available to be selected by a user. In an active-distributed standby mode, a master active node may be initially selected (block 410) and configured (block 420) to perform the same service proxy functions of the distributed node service management as the master active node does in the active-standby mode described above. However, in the event of a failure (block 440), each of the standby nodes of the distributed computing system may be selected (block 410) and configured (block 420) to perform (block 430) their own distributed node service management functions on a local basis including managing the sending of error and other service notifications for that particular standby node to a remote support center, providing remote access to that particular standby node of the distributed computing system, monitoring the health of that particular standby node of the distributed computing system, and providing local access to that particular standby node of the distributed computing system. Accordingly, in the active-distributed standby mode, in the event of failure by the master active node, each standby node may be configured to perform local service functions of the distributed node service management functions instead of being performed by a service proxy such as a substitute master active node as is done in the active-standby mode.

In another aspect of the present description, a distributed node service management in accordance with one embodiment of the present description may include another mode of operation referred to herein as the "fully distributed" mode, which may be available to be selected by a user. In the fully distributed mode, each of the standby nodes of the distributed computing system may be selected (block 410) and configured (block 420) to perform (block 430) their own distributed node service management functions without a service proxy node. Thus, in the fully distributed mode, each of the standby nodes of the distributed computing system may be selected (block 410) and configured (block 420) to perform (block 430) their own distributed node service management functions including managing the sending of error and other service notifications for that particular standby node to a remote support center, providing remote access to that particular standby node of the distributed computing system, monitoring the health of that particular standby node of the distributed computing system, and providing local access to that particular standby node of the distributed computing system, without the services of a service proxy. Accordingly, in the fully distributed mode, a master active node is not utilized to perform service proxy distributed node service management functions for all of the processor nodes of the distributed computing system. Instead, in the fully distributed mode, each standby node may be configured to perform its own distributed node service management functions without the services of a service proxy provided by a master active node as is done in the active-standby and active-distributed standby modes.

In yet another aspect of the present description, a distributed node service management in accordance with one embodiment of the present description may include another available mode of operation referred to herein as the "service aggregation" mode. In a service aggregation mode, two or more processor nodes are selected (block 410) and configured (block 420) to assume the role and responsibilities of a master active node at the same time. Thus, in the service aggregation mode, all of the master active nodes coordinate and balance the load of the service proxy distributed node service management functions among the master active nodes and on behalf of the other processor nodes of the distributed computing system.

The manner in which the load of the service proxy distributed node service management functions may be distributed among the master active nodes may vary depending upon the particular application. For example, responsibility for acting on behalf of particular processor nodes may be assigned to particular master active nodes. Also, service proxy distributed node service management functions may be shifted from one master active node to another depending upon the workload of each master active node at particular instances in time. In certain cases, a large error or other service notification package such as a call home package may be subdivided and offloaded to more than one master active node for forwarding to a remote support center.

In the event of a master active node failure (block 440), one or more of the other master active nodes may fully assume the service proxy distributed node service management responsibilities of the failed master active node. Thus, in the event of a master active node failure (block 440), one or more of the other master active nodes may be selected (block 410) and configured (block 420) to perform (block 430) an additional share of the service proxy distributed node service management functions beyond those already being performed by the selected master active nodes.

In still another aspect of the present description, a distributed node service management in accordance with one embodiment of the present description may include yet another available mode of operation referred to herein as the "health check" mode for the distributed node service management. In the health check mode, the distributed node service management monitors the processor nodes of the distributed computing system, including any master active, standby, or fully distributed master active node, depending upon the mode selected, to identify various errors including software, hardware and network errors. In addition, the health check mode may facilitate maintaining consistent master active and standby node states.

Figure 5:
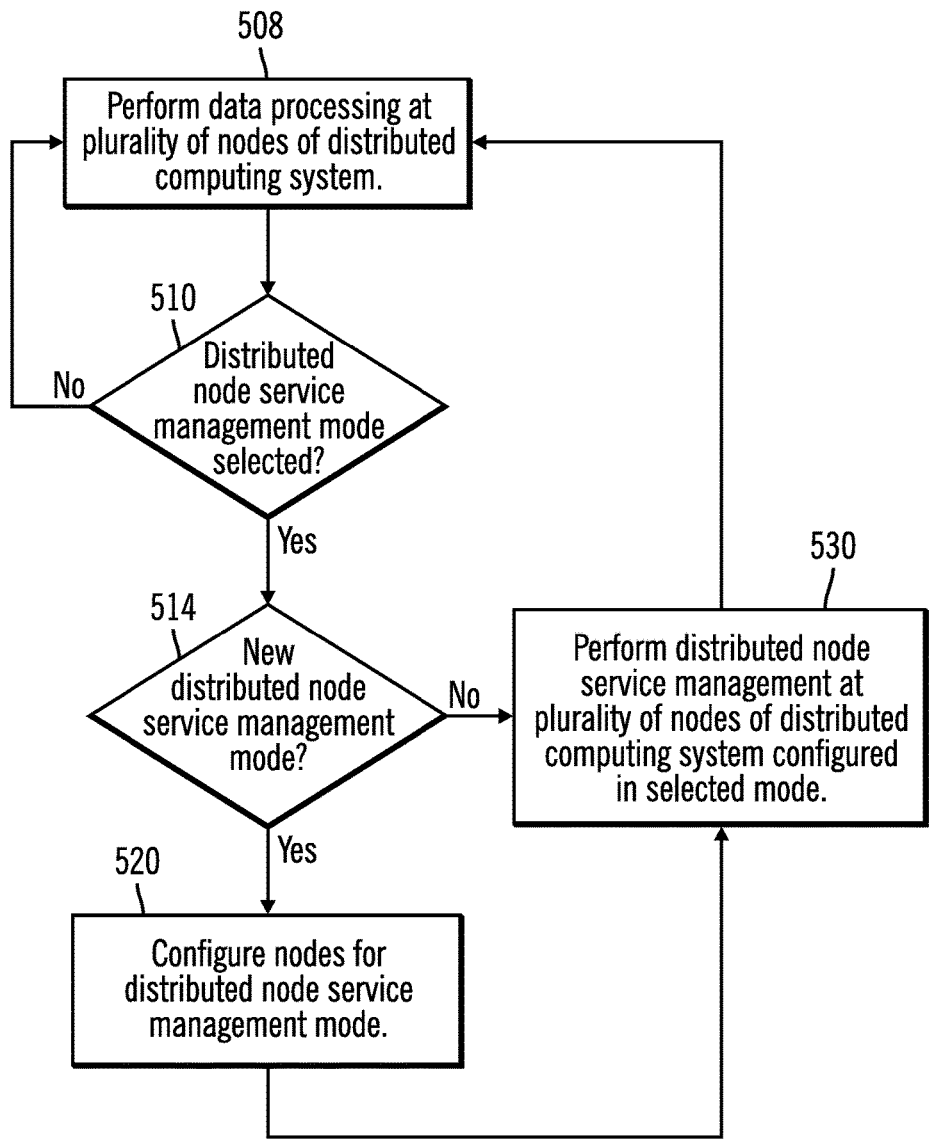
FIG. 5 depicts another example of operations for distributed node service management in accordance with another aspect of the present description.

FIG. 5 depicts another example of operations for distributed node service management in accordance with one embodiment of the present description. As previously mentioned, data processing functions such as data storage functions provided by the data processing programming 350 of each processor node 220 may be performed (block 508) at a plurality of processor nodes 220 of a distributed computing system. In the distributed computing system, a determination is made as to whether a mode of distributed node service management has been selected (block 510). As previously mentioned, various modes of distributed node service management available in one embodiment include the active-standby mode, the active-distributed standby mode, the fully distributed mode, the service aggregation mode, and the health check mode. It is appreciated that other modes may be utilized in addition thereto or instead of those explicitly described herein, depending upon the particular application.

In one embodiment, the mode may be selected manually by the user. In another embodiment, the mode may be selected automatically. If no distributed node service management mode has been selected, data processing functions such as data storage functions provided by the data processing programming 350 of each processor node 220 may continue to be performed (block 508) at a plurality of processor nodes 220 of a distributed computing system, but without distributed node service management being also performed at the plurality of processor nodes 220 of the distributed computing system. If a distributed node service management mode has been selected, a determination (block 514) is made as to whether the distributed node service management mode is newly selected. If so, the processor nodes 220 of the distributed computing system may be configured (block 520) for distributed node service management in the selected mode. Distributed node service management may then be performed (block 530) in the selected mode.

In another aspect of the present description, a user has the option of changing (block 514) the selected mode of operation. Thus, conditions in the distributed computing system may change such that a different mode of operation may be more appropriate. For example, the number of processor nodes in the distributed computing system may have changed such that a different mode of operation of distributed node service management may be more suitable. If so, a different mode of distributed node service management is selected (block 514), and configured (block 520) for distributed node service management. Distributed node service management may then be performed (block 530) in the newly selected mode.

Also, certain modes of operation such as the health check mode may be entered periodically to check on the health of the distributed node service management. Also, certain modes of operation such as the health check mode may be entered simultaneously with other modes of operation such as the active-standby mode, for example. If so, a timer may be utilized for example to determine when to enter the health check mode.

As previously mentioned, the active-standby mode permits a user to configure one of the processor nodes 220 as a master active node and one or more other active nodes 220 as standby nodes. The configuration may be made manually or automatically. The master active node of the processor nodes 220 performs the service proxy distributed node service management functions including coordinating and managing the sending of error or other service notifications to a remote support center, such as the remote support center 201. In the event the master active node encounters an error when performing a distributed node service management function such as sending a call home package to the service center, one or more of the service proxy functions of the distributed node service management may failover to a standby node to be performed by that standby node, according to the configuration set by the user.

The master active node performs the service proxy distributed node service management functions on behalf of the other processor nodes which are members of the distributed computing system. Thus, when the distributed node service management is operating in the active-standby mode, member nodes send error or other service notifications to a master active node which coordinates the offloading of these notifications for the member nodes to a remote support center.

If an error occurs such that the error notification cannot be offloaded to a remote support center, node failover procedures may be invoked. Upon initiating a failover, the new status of the member nodes including the identity of the new master active node is communicated and otherwise coordinated among all the member nodes of the distributed computing system.

In one embodiment, if the member node that encountered an error is not able to communicate with the master active node, but is in a cluster that contains one or more peer nodes which are not only active nodes in the same cluster, but also members of the distributed computing system, one embodiment of the distributed node service management provides a limited failover which allows a peer member node in the cluster to send the error or other service notification to the master active node on behalf of the processor node that originally encountered the error. An alternate communication path or method may be used between the peer nodes in the cluster to coordinate the sending of the service notification to the master active node of the distributed node service management. Thus, a full failover operation resulting in a new master active node may be avoided in such situations in which a peer member node of a cluster is able to communicate with the master active node.

Under some conditions, however, a full failover operation may be appropriate. If so, the distributed node service management may request one or more standby nodes to send an error notification to a support center and initiate a failover operation such that a standby proxy server becomes the new master active node upon detecting various conditions including the following conditions: a) the master active node is able to communicate with the member node that encountered the error but is unable to communicate with a remote service center, b) the member node that encountered a failure is not clustered (i.e. does not have any peer nodes which are member nodes of the distributed computing system) and is not able to communicate with the master active node, or c) the cluster peer member node of a member node that encountered a failure in a cluster is not able to communicate with the master proxy server.

In another aspect of the present description, in the event of a full failover condition from a master active node to a standby node or in the event of a limited failover between peer nodes in the same cluster, the distributed node service management may be configured to enter the health check mode and periodically check the status of the member nodes of the distributed computing system. If in such a health check it is determined that a member node as originally configured is healthy, that processor node may be reconfigured to automatically revert to a preferred distributed node service management system configuration. In this manner, the distributed node service management may exhibit a degree of self healing.

Figure 6:
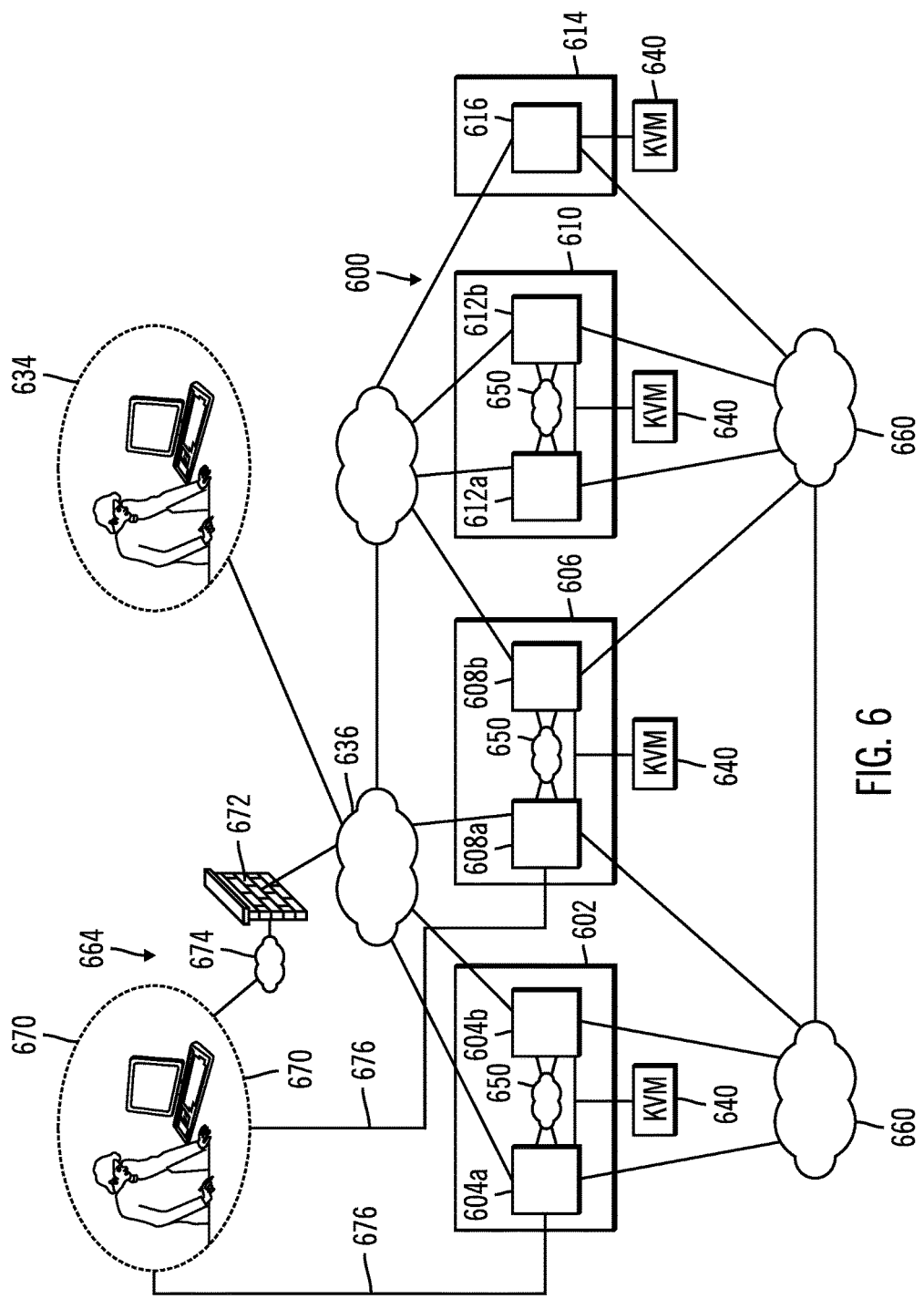
FIG. 6 illustrates another example of a computing environment having a distributed computing system employing a distributed node service management system in accordance with one aspect of the present description.

FIG. 6 shows another example of a distributed computing system 600 in accordance with the present description. The distributed computing system 600 may a distributed computing system of the type indicated at 200 in FIG. 2 or may be another type of distributed computing system, depending upon the particular application.

In this embodiment, the distributed computing system 600 has three cluster computing devices, a cluster 602 having peer processor nodes 604a, 604b, a cluster 606 having peer processor nodes 608a, 608b, and a cluster 610 having peer processor nodes 612a, 612b. In addition, the distributed computing system 600 has a single processor node computing device, computer 614 having a processor node 616 which lacks a peer node in this example. It is appreciated that the distributed computing system 600 may have more or fewer clusters, more or fewer single processor node computing devices and more or fewer processor nodes in each device, depending upon the particular application.

The processor nodes 604a, 604b, 608a, 608b, 612a, 612b and 616 may be similar to the processor node 220 depicted in FIG. 3, for example, and thus may include aspects of the distributed node service management. However, it is appreciated that software and hardware configurations of the processor nodes may vary, depending upon the particular application.

In the illustrated embodiment, the distributed node service management of the distributed computing system 600 may be configured to operate in the active-standby mode, for example. Accordingly, processor node 604a of cluster 602, for example, may be configured as a master active node of the distributed node service management. In addition, processor node 604b of cluster 602, for example, may be configured as a first standby of the distributed node service management.

Further, processor node 608a of cluster 606, for example, may be configured as a second standby node of the distributed node service management. In addition, processor node 608b of cluster 606, for example, may be configured as a member node of the distributed node service management. Both processor nodes 612a, 612b of the cluster 610 have each been configured as member nodes in this example. Similarly, processor node 616 of the computer 614 may be configured as a member node.

The distributed computing system 600 may further include a workstation 634 which is connected to each of the computing devices 602, 606, 610, 614 over a user network 636, for example. A suitable manager program, such as ProtecTIER Manager, for example, may be run on the workstation 634 to provide configuration and monitoring access to each of the computing devices 602, 606, 610, 614. In addition, one or more keyboard, video, and monitor (KVM) interfaces 640 may be provided for the processor nodes of the computing devices 602, 606, 610, 614 to provide local access. The KVM interfaces 640 may be shared among one or more of the processor nodes of the computing devices 602, 606, 610, 614 through a suitable KVM switch.

In a clustered configuration such as that found in the cluster 602, the two processor nodes 604a, 604b are both active, ("active-active"), to provide access to the same data set. Similarly, the two processor nodes of each of the clusters 606, 610 are active-active to provide access to the same data set. An internal network 650 may be used to provide communication between the two processor nodes of each cluster 602, 606, 610.

In the illustrated embodiment, the distributed node service management of the distributed computing system 600 lacks a separate service console. Instead, the processor node 604a of cluster 602, configured as a master active node of the distributed node service management, provides a central point of service for the distributed computing system having multiple computing devices such as multiple ProtecTIER systems. Each computing device 602, 606, 610, 614 has a connection on an internal network 660 to communicate with each other in connection with the distributed node service management. The processor node 604a of cluster 602, configured as a master active node of the distributed node service management system, has an inbound/outbound connection 664 to connect to a support center 670. Such a connection 664 may be made, for example, over a broadband Ethernet connection that includes the network 636, a firewall 672 and the internet 674, for example. The master active node 604a and the first standby node 604b of the cluster 602 may also have one or more additional connections 676 which may be a modem connection, for example, to the support center 670. In the event of a failover to a target standby node other than node 604a, that target standby node may be configured as part of the failover operation to have an outbound connection 664 similar to that of the original master active node 604a.

In the illustrated embodiment, each member node of the distributed computing network 600 may maintain in a data structure (such as the data structure 380, FIG. 3), a local copy of the configuration information of the processor nodes of the distributed node service management. Hence, each processor node by consulting its local copy of the processor node configuration information, may determine the assigned role of each processor node as master active, standby, member, peer member, etc.

The master active node 604a of the cluster 602 of the distributed node service management facilitates access by the remote support center 670 to the processor nodes of the computing devices 602, 606, 610, 614. Conversely, the master active node 604a coordinates the forwarding of error or other service notifications by the computing devices 602, 606, 610, 614 to the remote support center 670. For example if member node 612b of the cluster 610 encounters an error, it may generate an error notification (such as a "call home package") and send the call home package to the master active node 604a which in turn forwards the call home package to a remote support center 670. In addition, service personnel at the support center 670 may log into the processor nodes of the computing devices 602, 606, 610, 614 using the resources provided by the master active node 604a of the distributed node service management.

A scenario will now be described to demonstrate various aspects of a distributed node service management in accordance with one embodiment of the present description. This scenario begins with a member node 612b of the cluster 610 encountering a problem, and queuing a request to "call home" in its outgoing request queue of the queues 370 of the processor node 612b of the cluster 610. The call home request is a message that requests that an error or other service notification be sent to the service center 670.

The member node 612b of the cluster 610 marks its queued call home request as "in progress" and sends the call home request via the network 660 to the master active node which in this example, is the processor node 604a of the cluster 602. In this scenario, due to some error or other condition, the member node 612b of the cluster 610 does not receive a timely response but instead the member node 612b of the cluster 610 times out waiting for a response from the master active node 604a of the cluster 602. A time out period may be set by a suitable timer or other timing process.

Following expiration of the time out period waiting for a response, the member node 612b of the cluster 610 determines that it is part of a cluster (cluster 610) and that its peer node (the processor node 612a of the cluster 610) is online (active) and also a member node of the distributed computing system 600. Accordingly, in this embodiment, the member node 612b of the cluster 610 contacts the peer member node 612a of the cluster 610 using a suitable network such as the network 650 or network 660, to send an error or other service notification by placing the call home request in the incoming request queue of the peer member node 612a of the cluster 610.

In response, the peer member node 612a of the cluster 610 obtains the call home request message from its incoming request queue and marks it as in progress. In addition, the peer member node 612a of the cluster 610 sends the call home request to the master active node 604a of the cluster 602, via the network 660. The master active node 604a of the cluster 602 receives the call home request in its incoming request queue.

The master active node 604a of the cluster 602 removes the call home request message from its incoming request queue and attempts to send the call home package associated with the call home request message to the service center 670 via the network 636 and outbound connection 664. In this scenario, the master active node 604a of the cluster 602 fails in its attempt to send the call home package to the service center 670 via the network 636 and outbound connection 664.

Accordingly, the master active node 604a of the cluster 602 sends a failure message to the peer member node 612a of the cluster 610 using a suitable network such as the network 650 or network 660 indicating that it cannot send the call home error notification message to the support center 670.

In response to the received failure message, the peer member node 612a of the cluster 610 removes the call home request from its incoming request queue and notifies the member node 612b of the cluster 610 of the failure. In the illustrated embodiment, the peer member node 612a of the cluster 610 notifies the member node 612b of the cluster 610 of the failure by updating a flag in the call home request message and placing the call home request message in the incoming request queue of the member node 612b of the cluster 610. The updated flag indicates to the member node 612b of the cluster 610 that the peer member node 612a of the cluster 610 may communicate with the master active node 604a of the cluster 602 but that the master active node 604a of the cluster 602 cannot send the call home error notification package to the support center 670.

In response to the updated flag, the member node 612b of the cluster 610, in the illustrated embodiment, raises two alerts based on the updated flag information provided by the peer member node 612a of the cluster 610 and from the initial failure of the member node 612b of the cluster 610 to receive a response from the master active node 604a of the cluster 602. In the illustrated embodiment, these alerts are: 1) an alert indicating that the link between the member node 612b of the cluster 610 and the master active node 604a of the cluster 602 is down, and 2) an alert indicating that the master active node 604a of the cluster 602 cannot communicate with the external support center 670. As result, the support center 670 may address not only the original error leading to the original call home request, but also the ancillary problems described above and as set forth in the alerts.

In addition, the member node 612b of the cluster 610 examines its local copy of the distributed node configuration information stored at the member node 612b and determines that the processor node 604b of the cluster 602 has been configured as first standby node. Although the master active node 604a and the first standby node 604b are in the same cluster 602 in this scenario, it is appreciated that processor nodes in entirely different clusters may be selected for configuration as the master active node and the first standby node, respectively. The selection of the particular roles for each processor node of the distributed computing system may vary depending upon a number of factors including configuration settings by the user and the order in which processor nodes are added to the system, for example.

Having identified the processor node 604b of the cluster 602 as being configured as the first standby node, the member node 612b of the cluster 610 sends a call home request to the first standby node 604b of the cluster 602. In response, the first standby node 604b of the cluster 602 removes the call home request message from its incoming request queue and attempts to send a call home message to the service center 670 via the network 636 and the outbound connection 664. In this scenario, the first standby node 604b of the cluster 602 likewise fails in its attempt to send the call home message to the service center 670 via the network 636 and the outbound connection 664.

Accordingly, the first standby node 604b of the cluster 602 sends a failure message to the member node 612b of the cluster 610 via the network 660. In response, the member node 612b of the cluster 610 raises yet another alert indicating that the first standby node 604b of the cluster 602 cannot communicate with the external support center 670. In addition, the member node 612b of the cluster 610 examines its local copy of the distributed computing system configuration information and determines that the processor node 608a of the cluster 606 has been configured as the next standby node.

Accordingly, the member node 612b of the cluster 610 marks the call home request in its outgoing message queue as in progress to the second standby node 608a of the cluster 606, and sends the call home request to the second standby node 608a of the cluster 606 via the network 660. In response, the second standby node 608a of the cluster 606 removes the call home request message from its incoming request queue and attempts to send a call home message to the service center 670 via the network 636 and the outbound connection 664. In this scenario, the second standby node 608a of the cluster 606 successfully sends the message as indicated by receipt of a reply message from service center via the inbound connection 664 and the network 636.

In response to the receipt of the reply message from the service center 670, the second standby node 608a of the cluster 606 sends a success response message to the member node 612b of the cluster 610 via the network 660. In response to the success response message, the member node 608a of the cluster 606 broadcasts a master proxy node state change notification message to all the processor nodes in the distributed computing system. In addition, the member node 612b of the cluster 610 removes the call home request from its outgoing request queue.

In response to the master proxy node state change notification, each processor node updates its local copy of the distributed node service management configuration information to indicate that the second standby node 608a of the cluster 606 is now the master active node. In addition, one or more processor nodes may be configured as standby nodes.

In an alternate embodiment, the user may optionally configure the distributed node service management so that in the event of a failure to successfully reach the remote support center, the master active node attempts to send a call home package or other service notification to the support center over an alternate connection such as modem 676. The attempt by the master active node over the alternate connection may be made for example, before the distributed node service management causes a standby node to assume the role of the service proxy and to take over attempting to send the service notification to a support center. Thus, in the scenario above, the master active node 604a of the cluster 602 upon failing in its attempt to send the call home package to the service center 670 via the network 636 and outbound connection 664, may try again to send the call home package to the service center 670 but over the modem connection 676 instead of over the network 636 and outbound connection 664. If successful, a failover of the service proxy from the master active node 604a to a standby node may be avoided. However, the master active node 604a may issue an alert indicating a failure to send the call home package to the service center 670 via the network 636 and outbound connection 664. If unsuccessful, the master active node 604a of the cluster 602 sends a failure message to the peer member node 612a of the cluster 610 via the network 660 indicating that it cannot send the call home service notification message to the support center 670, which initiates a failover of the service proxy from the master active node 604a to a standby node as described above.

In the scenario described above, the distributed node service management had been configured to be in the active-standby mode. In an alternative embodiment, the distributed node service management may be configured to be in the active-distributed standby mode. In this alternative scenario a member node which is unsuccessful in its request of the master active node to forward a call home package on behalf of the member node may itself send the call home package or other service notification to the support center directly as opposed to configuring a standby node to send the call home package. For example, in the scenario above where the member node 612b of the cluster 610 does not receive a timely response but instead the member node 612b of the cluster 610 times out waiting for a response from the master active node 604a of the cluster, the member node 612b of the cluster 610 may send the call home package directly to the support center as opposed to requesting another standby node (such as the first standby node 604b of the cluster 602) to send the call home. Such an arrangement provides a centralized and consolidated point of service proxy as long as the master active node is functioning properly. However, should the master active node fail, the active-distributed standby mode provides additional flexibility in the failover characteristics of the distributed node service management in order to address differing user needs.

In yet another embodiment, the distributed node service management of the distributed computing system 600 may be configured to operate in the service aggregation mode, for example. Thus, in an alternative scenario, processor node 604a of cluster 602, for example, may be again configured as a master active node of the distributed node service management. However, processor node 604b of cluster 602, for example, may be configured as a member node instead of a first standby of the distributed node service management, in this alternative scenario.

Further, processor node 608a of cluster 606, for example, may be configured as a master active node of the distributed node service management. In addition, processor node 608b of cluster 606, for example, may be configured as a member node of the distributed node service management. Both processor nodes 612a, 612b of the cluster 610 have each been configured as member nodes in this example. Similarly, processor node 616 of the computer 614 may be configured as a member node.

In this alternative scenario, the member node 612b of the cluster 610 encounters a problem, and queues an error or other service notification which includes a call home package containing a core dump that is several hundred megabytes in size to be forwarded to the remote support center 670. In addition, the member node 612b of the cluster 610 marks the call home request in its local outgoing request queue as being in progress, and sends the call home request to the master active node 604a of the cluster 602 via the network 660.

The master active node 604a of the cluster 602 coordinates with the master active node 608a of the cluster 606 to determine which processor node is best suited to service the call home request and offload, that is, forward the call home package to the service center. In accordance with one aspect of the present description, a variety of factors may be considered in determining the processor node best suited to perform the message offload to the service center. In the illustrated embodiment, the factors considered include the level of involvement of each candidate processor node in a) host input/output activities, b) data processing activities such as data replication, deduplication, back up etc, c) storage activity including disk and tape activity and d) other service proxy related tasks in progress such as remote access, additional call home service notifications, queue depth, etc. Additional factors considered in determining the appropriate processor node to handle the call home package include a) the size of the call home package to offload, b) the estimated time or data rate to offload the call home package, and c) the CPU utilization rate of the candidate processor node. It is appreciated that other factors may be considered, depending upon the particular application.

In this alternate scenario, after consideration of the above factors, the distributed node service management determines that the master active node 608a of the cluster 606 is better suited to handle the call home service notification offload to the remote support center. Accordingly, the master active node 604a of the cluster 602 responds to the member node 612b of the cluster 610 stating that the call home request should be routed to the master active node 608a of the cluster 606.

In response, the member node 612b of the cluster 610 sends the call home request to the master active node 608a of the cluster 606. To prevent further coordination for the same call home service notification and to prevent a ping pong effect where both master nodes state that the other processor node should handle the request, each master node tracks negotiated/coordinated requests by examining negotiation identification information. For example when the master active node 608a of the cluster 606 receives the call home service notification request, it examines the negotiation identification information associated with the request and determines that the request has already been negotiated and that the master active node 608a needs to service the request. Since master node utilization may be dynamic and fluctuate over time, different master active nodes may be selected depending upon the respective utilization of the master active nodes at the time of the negotiation.

In response to receipt of the call home request, the master active node 608a of the cluster 606 removes the message from its incoming request queue and attempts to send the call home package to the service center via the network 636 and the outbound connection 664. In this scenario, the master active node 608a of the cluster 606 is successful and gets a success reply message from the service center via the inbound connection 664 and the network 636. In addition, the master active node 608a of the cluster 606 sends a success response message to the member node 612b of the cluster 610 via the network 660. In response, the member node 612b of the cluster 610 removes the call home request from its local outgoing request queue. Thus, a push methodology may be implemented with master nodes coordinating which processor node is best suited to service a request to facilitate failover in the event of a master node failure.

In yet another embodiment, the distributed node service management of the distributed computing system 600 may be configured for the distributed node service management to operate in the health check mode, for example. Thus, in an alternative scenario, the health check mode may be configured to be entered periodically to detect errors in connection with the processor node roles of master active, standby, and member within the current operational mode.

For example, pursuant to the health check mode, the master active node periodically may send a request message to each active node in the distributed computing system to determine their current operational status. If the master active node does not get a response from a particular processor node to the operational status request, the master active node may check its local data structures 360 and examine the local copy of the distributed node service management system node configuration information to determine if the master active node is in a cluster and has a peer member node that is online. If it is determined that the master active node is in a cluster and does have a peer member node that is online, the master active node sends a request to the peer member node of the cluster to determine the health of the target member node that did not give a response to the operational status request. Although described above in connection with a master active node, it is appreciated that in a distributed node service management system in accordance with the present description, the user may configure any of the nodes of the distributed node service management system to perform a health check of the system as described above while each node continues to provide data processing functions as well as other distributed node service management functions.

If the peer member node of the master active node cannot determine the health of the target member node, the master active node checks its local copy of the distributed node service management system node configuration information to determine if the target member node is part of a cluster and if so whether it has a peer member node that is online. If the target member node is part of a cluster and the peer member node of the target member node is online, the master active node sends a request to the peer member node of the target member node, to determine the health of the target member node through the internal cluster network 650 or other suitable interface between peer nodes of that cluster.

In one embodiment, if a standby node does not receive an expected operational status request message from the master active node, the standby node may assume that the master active node has experienced a failure and the standby node may assume the service proxy role of the master active node.

In that a particular topology of processor nodes in a distributed node service management may include multiple standby nodes, in one embodiment, the distributed node service management may be configured so that the service proxy role of the master active node will failover to the first standby node. If the first standby node is not operational, the distributed node service management may be configured to failover to one of the other standby nodes which is operational. In another embodiment, to reduce or eliminate premature failovers, a tolerance or threshold level may be set such that a failover of service proxy functions from a master active node to a standby node does not take place until the number of expected operational status requests that the standby node does not receive, has exceeded a threshold value.

In another aspect of the present description, the distributed node service management system may be configured to instruct processor nodes that encountered failures in attempts to communicate with the service center to periodically send test messages to the service center. Upon receiving a success response from the service center, a distributed node service management system state may be broadcasted to all processor nodes in the distributed computing system indicating that the particular processor node is now able to successfully communicate with the remote service center.

In the scenario discussed above in which the original master active node 604a and first standby node 604b experienced failures in attempting to communicate with the remote service center, upon subsequently receiving a success response from the service center in response to a test message to the remote service center, the distributed node service management system may be configured to revert to the original configuration using the original master active node 604a as the first point of initiation to handle requests to contact the remote service center, and to revert to using the first standby node 604b upon encountering another failure at the master active node 604a.

Similarly, the distributed node service management system may be configured to instruct processor nodes that encountered failures in attempts to communicate with other processor nodes to periodically send test messages to the other processor node. Upon subsequently receiving a success response from the other processor node in response to a test message to the other processor node, the distributed node service management system may be configured to revert to the original configuration.

Accordingly, it is recognized that in those embodiments in which test messages indicate successful resolution of a problem which initiated a configuration change to overcome the problem, a distributed node service management system in accordance with the present description may automatically revert to a preferred configuration without user intervention. In addition, such an arrangement may facilitate identifying and isolating specific faulty processor nodes, communication paths, software instances and hardware components. Other features may be realized in other embodiments, depending upon the particular application.

As previously mentioned, an operational mode of distributed node service management may be selected (block 510, FIG. 5) such as the active-standby mode, the active-distributed standby mode, the fully distributed mode, the service aggregation mode, or the health check mode, for example. It is appreciated that other modes may be utilized in addition thereto or instead of those explicitly described herein, depending upon the particular application.

In one embodiment, the mode may be selected manually by the user or the mode may be selected automatically. In one aspect of the present description, the distributed node service management may provide a dynamic and flexible configuration of a distributed node service management system topology based on a specific user hardware and software environment as well as user requirements, if any. A user may use a graphical user interface to select and operate a particular distributed node service management operating mode (e.g. active-standby, active-distributed standby, fully distributed, aggregated service mode), and assign distributed node service management roles to specific processor nodes (for example, master active node, standby (failover) node, etc), and configure the distributed node service management system to provide for automated creation of a distributed node service management system topology. Such an automated creation of a distributed node service management topology may include automated node joining procedures in which a processor node may be automatically joined to the distributed node service management system and configured to a distributed node service management role in accordance with the selected distributed node service management mode.

For example, for a particular distributed node service management mode, a processor node joining the topology of the distributed node service management system may be assigned a role based on a variety of factors including pre-defined and configurable user preferences which may facilitate a "plug and play" type process as processor nodes are added to the distributed node service management system. Other factors include hardware configuration and network connectivity which may be discovered by the distributed node service management system to facilitate a "plug and play" type process. Alternatively, the distributed node service management system may allow a user to specify the distributed node service management role on a node by node basis as processor nodes are added or reconfigured.

In yet another aspect, the distributed node service management system may permit switching between distributed node service management operational modes in a manner which may be non-disruptive to on-going data processing functions unrelated to the distributed node service management and may be configured to switch operational modes in an automated fashion, depending upon the particular application. In still another aspect, the distributed node service management system may be configured to automatically select a processor node for the master active role based on node capabilities, for example. Such features may be accomplished utilizing the distributed node service management system to configure different distributed node service management operational modes based on user needs for the various types of distributed computing applications.

The following will describe one example of establishing a distributed node service management system in accordance with one embodiment of the present description. In this example, the operational mode of the distributed node service management system will include a master active node. In this example, the master active node coordinates the node joining process for additional processor nodes being added to the distributed node service management system. It is appreciated that in other operational modes, a master active node may not be present. In such operational modes, the node joining process may be coordinated by other processor nodes such as a distributed standby node, for example, or may be instructed manually, for example, by a user.

Furthermore, an example of a processor node joining an existing distributed node service management system is described. The following will also describe an example of nondisruptive, online switching between operational modes and node roles in a distributed node service management system in accordance with the present description. Also described will be an example of a distributed node service management system automatically redistributing standby node redundancy in the event of a node failure.

As previously mentioned, a distributed node service management system having a master active node may be established manually or automatically. In a manual installation, the service distributed node service management system may, in a graphical user interface, for example, prompt a user to confirm whether a new distributed node service management system is being installed, to select the distributed node service management system operational mode (e.g. active-standby), to indicate any node role assignment preferences (such as, for example, maintaining at least 33% of the processor nodes as nodes in the standby role), and to indicate whether the distributed node service management system is to automatically redistribute redundancy in the event of certain failures. Other information may be manually selected or configured, depending upon the particular application. Such user prompting may occur, for example, as a processor node is being added to a distributed computing system or when reassigning the operational mode of an existing distributed node service management system or reassigning the roles of one or more processor nodes in a distributed node service management system.

Alternatively, during installation of some or all of a distributed node service management system in accordance with the present description, a user may instruct the distributed node service management system to completely automate the establishment of a distributed node service management system in an operational mode, as well as the joining of processor nodes to the distributed node service management system in the operational mode. For example, a user may accept factory default distributed node service management system settings, such as for example, default setting which specify the operational mode as, for example, the active-standby operational mode, maintenance of at least, for example, 25% of the processor nodes as operating in a standby role, automatically redistributing node redundancy in the event of certain failures, etc.

Figure 7:
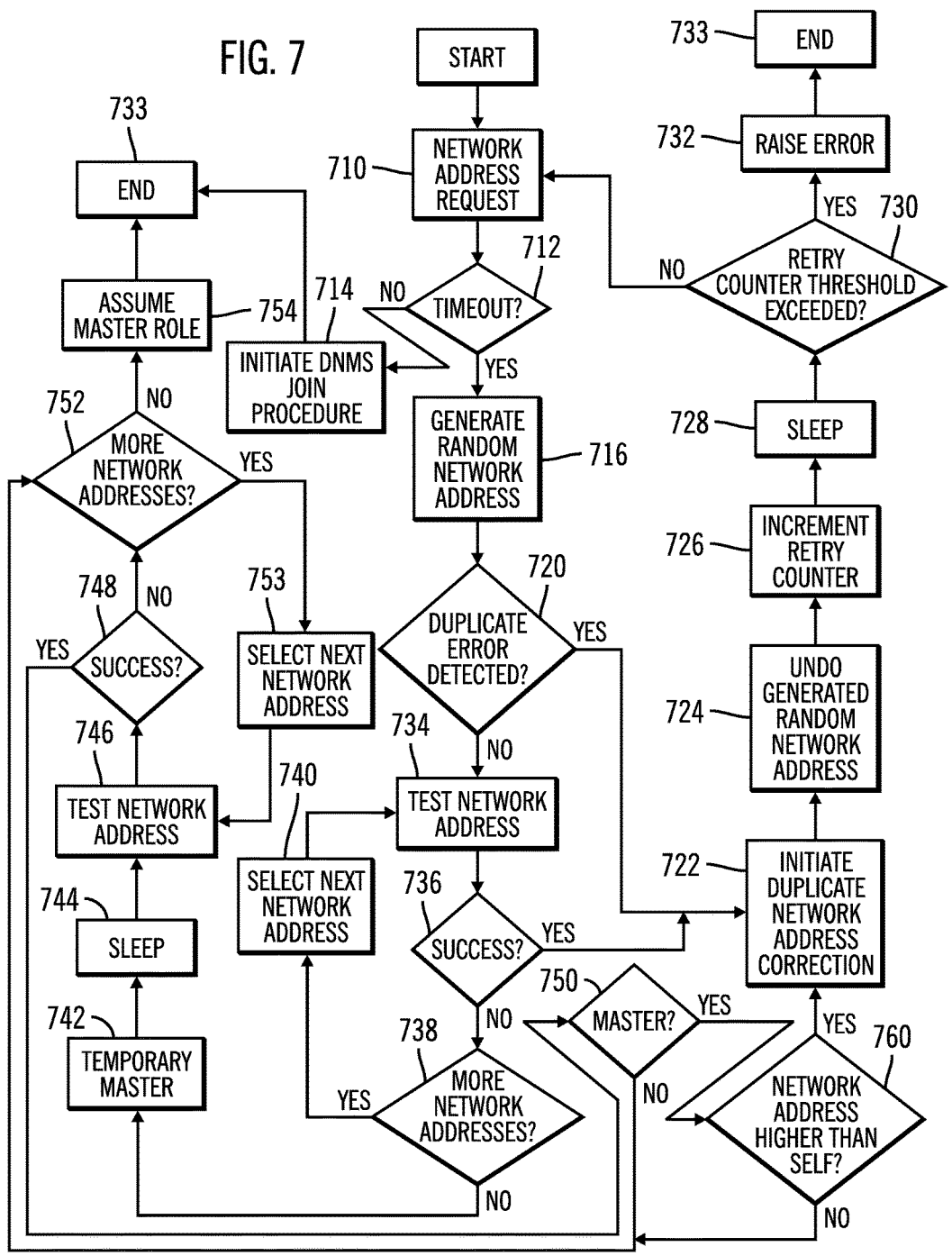
FIG. 7 depicts another example of operations for distributed node service management in accordance with another aspect of the present description.

FIG. 7 shows an example of operations for establishing a distributed node service management system in an automated mode. In one operation a processor node operating the distributed node service management software 360 sends (block 710) a request for a network address such as an Internet Protocol (IP) address in accordance with a suitable network configuration protocol such as the Dynamic Host Configuration Protocol (DHCP) to a server or other host providing the network addressing service for computing devices on the network 660. In the illustrated embodiment, the network address assigning function in some modes such as the active-standby operational mode, is provided by the master active node. Accordingly, if a network address is received in response to the request for a network address before a timer times out (block 712), it has been established that the master active node is already present and operational and that the distributed node service management system has been established. Hence, the processor node may proceed to a "joining" procedure (block 714) for joining the existing distributed node service management system.

On the other hand, if a network address is not received in response to the request for a network address before the timer times out (block 712), it has been established that the master active node is not already present and that the distributed node service management system is not yet fully operational. Hence, the processor node may proceed to be configured as the master active node, the first processor node of the new distributed node service management system.

Since a master active node providing a network address assigning function has not yet been established, a random network address may be generated (block 716) for the processor node by invoking a random number generator for example, to create the last octet, for example, of a well defined network address. It is appreciated that a suitable network address may be generated using other procedures, depending upon the particular application.

It is also appreciated that in some applications, there may be a small chance that this process for establishing a distributed node service management system in an automated mode may generate a duplicate network address on the network 660 if more than one processor node is executing the establishment procedure. Accordingly, in the establishment procedure, a check (block 720) is made to determine if a duplicate network address is detected. If a duplicate network address is detected, the establishment procedure proceeds to correct (blocks 722-732) the duplicate network address.

More specifically, a procedure to correct a duplicate network address error condition is initiated (block 722) which includes unassigning (block 724) the temporary randomly generated duplicate network address, incrementing (block 726) a retry counter, and allowing the establishment procedure to sleep (block 728) for a predetermined period of time. The sleep period allows conditions on the network 660 to settle in the event another processor node is in the process of establishing a temporary master node, for example.

Upon waking up, the establishment procedure checks (block 730) the retry counter to determine if the retry counter exceeds a threshold. If so, it is determined that there have been too many retry attempts and the establishment procedures proceeds to raise (block 732) an error alert and the establishment procedure ends (block 733). If, the retry counter has not exceeded (block 730) the retry threshold, the establishment procedure returns to again send (block 710) a request for a network address to determine if a master active node has been established at another processor node.

Thus, if a network address is received in response to the request for a network address before a timer times out (block 712), it has been established that a master active node is already present and operational and that the distributed node service management system has been established. Hence, the processor node may proceed to a "joining" procedure (block 714) for joining the existing distributed node service management system.

On the other hand, if a network address is not received in response to the request for a network address before the timer times out (block 712), it has been determined that the master active node is not already present and that the distributed node service management system has not yet been established. Hence, a random network address may again be generated (block 716) and a check (block 720) is again made to determine if a duplicate network address is detected. If a duplicate network address is detected, the establishment procedure proceeds again to correct (blocks 722-732) the duplicate network address.

If it is determined (block 720) that the randomly generated network address is not a duplicate, the processor node may utilize that randomly generated network address as its network address unless there is another master active node that may be in the process of being established or may have recently been established. In the illustrated embodiment, a range of network addresses is reserved on the network 660 for the processor nodes of the distributed node service management system. To determine if another master active node has already been established at a network address within the reserved range, the establishment procedure tests (block 734) a network address within the reserved range by pinging the address in this example. If the ping is successful (block 736), the pinged network address may belong to an already established master active node. Hence, if the ping is successful, the establishment procedure unassigns (block 724) the random network address for the current processor node and proceeds to request (block 710) another network address. If a network address is received in response to the request for a network address before a timer times out (block 712), it has been established that a master active node is already present and operational and that the distributed node service management system has been established.

If the ping is unsuccessful (block 736), the establishment procedure determines (block 738) whether there are additional addresses to check within the reserved range. If so, the establishment procedure selects (block 740) the next address and pings (block 734) that address. Once all network addresses within the reserved range have been tested (block 734) without the current processor node receiving (block 736) a ping response, it is determined on a temporary basis that no other master active node has been established in the distributed node service management system and the current processor node is deemed (block 742) on a temporary basis as the master active node.

To ensure that another master active node was not in the process of being established during the prior ping checks (block 734), the establishment procedure sleeps (block 744) to provide additional time for conditions to settle on the network 660. Accordingly, after sleeping the establishment procedure again tests (block 746) by pinging the well defined network addresses within the reserved range to determine if multiple processor nodes may have been assigned as a temporary master active node. If the test (block 746) is successful (block 748), a determination is made as to whether (block 750) the responding processor node is a master active node (either on a temporary or permanent basis). If the test (block 746) is unsuccessful (block 748), or it is determined (block 750) the responding processor node is not a master active node (either on a temporary or permanent basis), a determination is made (block 752) as to whether there are additional addresses to check within the reserved range. If so, the next network address is selected (block 753) and the next address is tested (block 746).

Once all network addresses have been tested (block 746) without discovering (block 750) another master active node, the current processor node assumes (block 754) the role of the master active node in the distributed node service management system and the establishment procedure ends (block 733). As part of its role as the master active node, the current processor node becomes a network address assigning server such as a DHCP server, for example.

On the other hand, if the test (block 746) is successful (block 748), and it is determined (block 750) that the responding processor node is a master active node (either on a temporary or permanent basis), only one of the temporary master active nodes will retain its role as a master active node. In the illustrated embodiment, the surviving temporary master active node is selected as a function of the respective network addresses. In the illustrated embodiment, the temporary master active node having the higher network address retains its role as a master active node. Hence, a determination (block 760) is made as to whether the network address of the master active node that responded to the ping request is higher than the network address of the current processor node. If the network address of the master active node that responded to the ping request is higher than the network address of the current processor node, the establishment procedure unassigns (block 724) the random network address for the current processor node and proceeds to request (block 710) a network address from the other master active node. It is appreciated that other techniques may be used to ensure that a single master active node is retained.

Once a distributed node service management system has been established, candidate processor nodes may join (block 714) the distributed node service management system. In one example, a distributed computing system 600 (FIG. 6) having an existing distributed node service management system comprises a cluster 602 having a processor nodes 604*a*, 604*b*, which may be a ProtecTIER DD4 gateway, for example. A second cluster 606 has the processor node 608*a* and the processor node 608*b*. In this example, the processor node 604*a* of the cluster 602 has been established as the master active node by the establishment procedure discussed above. In addition, the processor node 608*a* of the cluster 606 has joined the distributed node service management system in the role of a standby service node. This is illustrated in FIG. 2.

Figure 8:
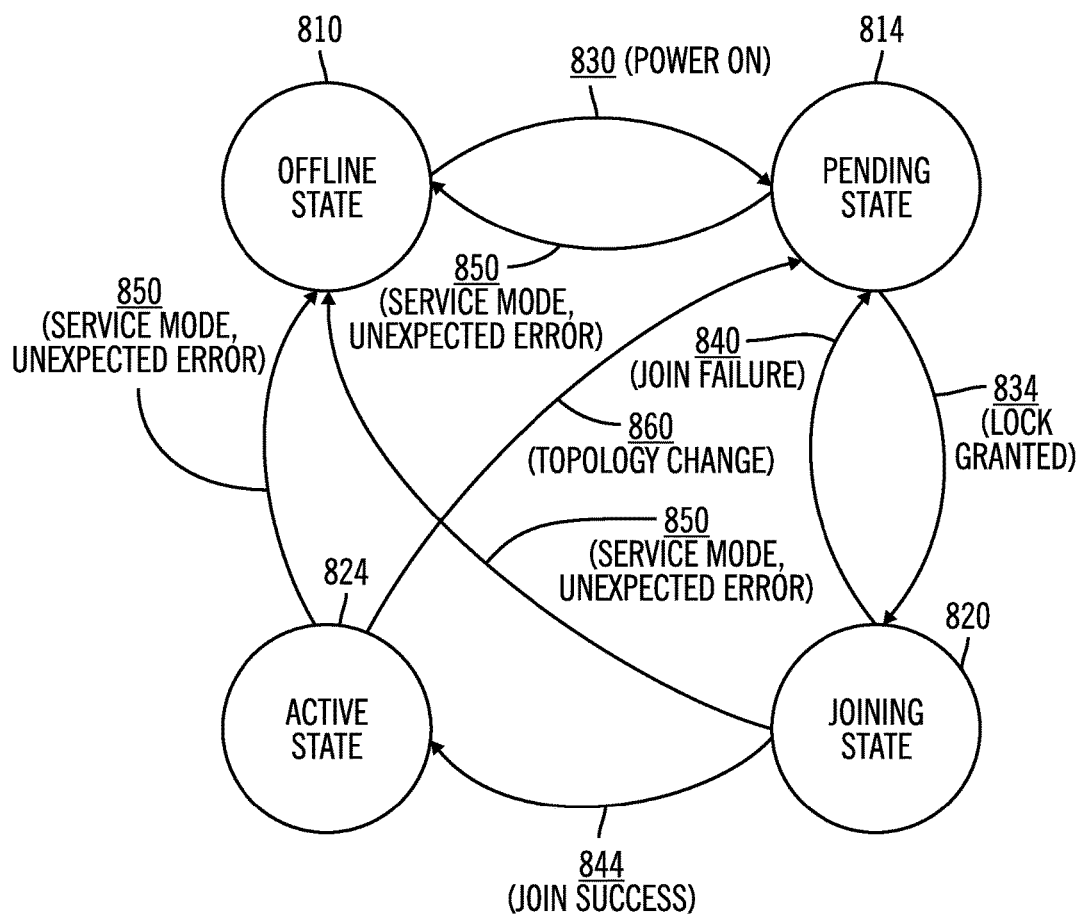
FIG. 8 depicts another example of operations for distributed node service management in accordance with another aspect of the present description.

In the illustrated embodiment, a processor node entering or leaving the distributed node service management system may be viewed as a state machine having four states as depicted in FIG. 8. The four distributed node service management states depicted in FIG. 8 are independent of the data processing states of a particular processor node. Hence, a processor node may enter or leave the distributed node service management states depicted in FIG. 8 without disrupting the data processing functions of the processor node. Thus, in a first state 810 designated "offline", the processor node is offline and is not currently active in the distributed node service management system. However, a processor node in the offline distributed node service management state 810 may nonetheless be fully online and operational performing data processing functions. In a second, "pending" state 814, the processor node again is not active in the distributed node service management system but is attempting to obtain authorization to initiate the joining procedures 712 (FIG. 7) to join the distributed node service management system. In the illustrated embodiment, the authorization to initiate the joining procedures is referred to herein as a "join lock" such that, in the illustrated embodiment, only one processor node at a time is granted the join lock. It is appreciated that other procedures may be utilized to manage joining of processor nodes to the distributed node service management.

In a third distributed node service management state 820, referred to herein as the "joining" state, the processor node is currently joining the distributed node service management system in the joining procedure 712. As previously mentioned, in the illustrated embodiment, only one processor node at a time may be in the joining state 820. However, it is appreciated that in other applications more than one processor node may join at a time, depending upon the particular application. In a fourth state 824, referred to as the "active" state, the processor node is an active participant in the distributed node service management system. Again, because the distributed node service management states depicted in FIG. 8 are independent of the data processing states of a particular processor node, a processor node may enter or leave the distributed node service management states depicted in FIG. 8 without disrupting the data processing functions of the processor node.

In the illustrated embodiment, as part of the power on initialization process (POI) of a particular processor node, the processor node moves in a transition 830 from the offline state 810 to the pending state 814. Thus, in the example of FIG. 6, a new cluster 610 having two processor nodes (node 612*a* of the cluster 610, processor node 612*b* of the cluster 610) is added to their distributed node service management system. Upon power on initialization of the processor node 612*a* of the cluster 610, the processor node 612*a* of the cluster 610 sends a network address request such as a DHCP request, on the internal network 660 of the distributed computing system 600. The network address request is answered by the master active node (master active node 604*a* of the cluster 602) which is also a DHCP server or other suitable network address protocol server, and a network address is assigned to processor node 612*a* of the cluster 610.

Having received an assigned network address, the processor node 612*a* of the cluster 610 in accordance with the joining procedure 714 sends a distributed node service management system join lock request to the master active node 604*a* to initiate the joining procedure (block 714 FIG. 7) described herein as follows. As previously mentioned, in the illustrated embodiment, if two or more processor nodes are attempting to join the distributed node service management system at the same time, only one may obtain the join lock from the master active node at a time. This lock procedure establishes a control on the automated join process to facilitate providing distributed node service management system assignments that are consistent with user preferences. It is appreciated that in other embodiments, more than one processor node may join the distributed node service management system at a time, depending upon the particular application.

In response to the join lock request, the master active node 604*a* of the cluster 602 sends a distributed node service management system join lock grant to the processor node 612*a*. Upon receipt of the join lock grant, the processor node 612*a* moves in a "lock granted" transition 834 to the joining state 820. In the illustrated embodiment, processor nodes lacking the lock grant may not enter the joining state 820. In the event that the processor node 612*a* encounters an error or other condition which prevents a successful joining to the distributed node service management system, the processor node 612*a* moves in a "join failure event" transition 840 back to the pending state 814.

One example of an error condition may include the processor node 612*a* sending a join lock request but failing to receive a lock grant in return. In an alternative embodiment, upon failure to receive a lock grant in response to a join lock request, the distributed node service management software 360 could direct the processor node 612*a* of the cluster 610 to go into a timed sleep and increment a counter. Such a timed sleep would provide for a suspension of the distributed node service management functions at the processor node 612*a* such that data processing functions of the processor node 612*a* pursuant to the data processing software 350 could continue.

After waking up from the sleep, the processor node 612*a* could issue another join lock request to the master active node 604*a*. If the processor node 612*a* again fails to receive a lock grant in response to a join lock request, the processor node 612*a* of the cluster 610 could again go into a timed sleep and increment a counter.

If the failed attempt counter crosses a threshold value which may have a default value or may be configurable by a user, the processor node 612*a*, under the direction of the distributed node service management software 360 may initiate a lock takeover process to free the join lock from the processor node that is holding the join lock. Such a lock takeover process may include, for example in one embodiment, the processor node 612a attempting to establish communication with the processor node that contains the lock. For example, the processor node 612a could query the master active node 604a concerning the status of the operational state of the processor node that possesses the join lock. Should it be determined that the processor node possessing the join lock is not operational, the master active node 604a may release the join lock possessed by the inoperative processor node and reissue the join lock grant to the processor node 612a.

In the joining state 820, the processor node 612a of the cluster 610 sends to the master active node 604a a request to join the distributed node service management system. The request may include node specification information such as, for example specifications identifying software versions being utilized by the processor node 612a of the cluster 610 to assist the master active node 604a in determining whether the processor node 612a should be permitted to join the distributed node service management system.

In response to the receipt of the join request, the master active node 604a of the cluster 602 reviews the node software specifications provided in the join request, compares those specifications for the processor node 612a to the specifications of other processor nodes already joined to the distributed node service management system and determines whether to approve the software of the processor node 612a for operation as a processor node in the distributed node service management system. If so, the master active node 604a confirms approval of the software specification for processor node 612a in a software specification confirmation reply message to the processor node 612a.

Should the processor node 612a of the cluster 610 fail to receive a software specification confirmation reply message approving the software specification of the processor node 612a, in one embodiment, the processor node 612a may raise an error condition alert indicating to a user of the distributed node service management system that there is a software or code version discrepancy preventing the processor node 612a from joining the distributed node service management system. Accordingly, the user may resolve the code version discrepancy by upgrading or downgrading the software versions at the processor nodes as appropriate to permit the processor node 612a to join the distributed node service management system.

While waiting for the error condition to clear, the processor node 612a of the cluster 610 may send a lock release request to the master active node 604a of the cluster 602, which releases the distributed node service management system join lock, permitting another processor node in the pending state 814 to request the join lock to initiate the process of joining the distributed node service management system. Further, the master active node 604a of the cluster 602 sends a lock release confirmation to the processor node 612a of the cluster 610. In response, the processor node 612a reverts to the pending state 814 in the "join failure" transition 840.

Once a processor node has joined the distributed node service management system, a persistent copy of software specification may be kept by each processor node of the distributed node service management system in its local data structure 380 (FIG. 3). Thus, if a particular processor node should leave the distributed node service management system and go to the offline state 810, the software specification for that offline processor node may still be used by the master active node to compare to the software specifications of processor nodes later joining the distributed node service management system. Accordingly, when the offline processor node seeks to return to the distributed node service management system, there is less chance of there being incompatible software specification issues to prevent its return.

In response to the software specification confirmation reply message from the master active node 604a, the processor node 612a of the cluster 610 seeking to join the distributed node service management system may send another join request message which may include additional node specification information such as, for example specifications identifying hardware versions. Such hardware specifications may include for example the machine type and serial number being utilized by the processor node 612a of the cluster 610, to assist the master active node 604a in determining whether the processor node 612a should be permitted to join the distributed node service management system.

In response to the receipt of the second join request, the master active node 604a of the cluster 602 reviews the node hardware specifications provided in the hardware specification join request, compares those hardware specifications for the processor node 612a to the hardware specifications of other processor nodes already joined to the distributed node service management system and determines whether to approve the hardware of the processor node 612a for operation as a processor node in the distributed node service management system. If so, the master active node 604a confirms approval of the hardware specification for processor node 612a in a hardware specification confirmation reply message to the processor node 612a. The hardware specification confirmation reply message approves the processor node 612a joining the distributed node service management system and includes various information concerning the distributed node service management system including the current distributed node service management mode such as active-standby, for example.

The confirmation reply message also identifies the role to be performed by the processor node 612a within the distributed node service management system. The role of the processor node 612a within the distributed node service management mode, may be selected using various techniques. For example, the user may have configured predefined rules for role assignment in the distributed node service management system. For example, the distributed node service management system may be configured to assign the number of processor nodes performing selected roles to meet or exceed certain percentages. Thus, in one scenario, the distributed node service management system may be configured to assign at least 20%, for example, of the processor nodes in the distributed node service management system to be standby nodes. Once the goal of at least 20% has been reached, processor nodes newly joining the distributed node service management may be assigned other roles.

Thus, in performing the joining procedure 714, the master active node may determine that there are, for example, four processor nodes already in the distributed node service management system and that one of them is already a standby node such that 25% of the processor nodes are standby. Thus, the goal of 20% of the processor nodes being in the standby role has ready been achieved. Accordingly, when the next processor node, processor node 612a in this example, seeks to join the distributed node service management system, the master active node managing the join procedure may assign the new processor node 612*a* of the cluster 610 the role of a member node. After the processor node 612*a* joins as a member node rather than a standby node, the constraint of 20% of the processor nodes being in the standby role (that is, one out of five is standby) remains satisfied.

Continuing in this scenario, if the next processor node joining is processor node 612*b* of the cluster 610 and the processor node 612*a* of the cluster 610 has already joined the distributed node service management system as a member node as described above, the master active node managing the join procedure may assign the processor node 612*b* of the cluster 610 (or another existing processor node) as a standby node in order to continue to satisfy the goal of at least of 20% of the processor nodes being a standby node (two out of six processor nodes (i.e. 33%) are standby nodes). The processor node assigned to the standby role may be selected based upon preferred processor node characteristics for a standby role such as, for example, broadband connectivity rather than modem connectivity. If on the other hand, the master active node managing the join procedure had assigned the processor node 612*b* of the cluster 610 as a member node and no existing processor node was reconfigured as a standby node, the goal of at least of 20% of the processor nodes being a standby node would not have been met since only one out of six (17%) would have been a standby nodes.

Another example of a technique for configuring role assignment in the distributed node service management system is to provide that one processor node out of every cluster is to be assigned the role of a standby node. Thus, in the scenario above in which the processor node 612*a* of the cluster 610 is assigned the role of a member node, the processor node 612*b* of the same cluster 610 would be assigned the role of a standby node.

Another example of a technique for configuring role assignment in the distributed node service management system is to provide that roles may be assigned to processor nodes as a function of the hardware or software specifications of the processor nodes and the network connectivity of the processor nodes. For example, in one embodiment, the master active node may determine whether a processor node joining the distributed node service management system has an optional modem and if so, automatically assign processor nodes having such a modem the standby role.

Yet another example of a technique for configuring role assignment in the distributed node service management system is to provide the user the opportunity to specify for individual processor nodes, the particular role that the processor node will be assigned upon joining the distributed node service management system. Such an option may provide additional flexibility and allow the user to set a custom level of error recovery and redundancy in the service distributed node service management system.

As previously mentioned, the hardware specification confirmation reply message approves the processor node 612*a* joining the distributed node service management system and includes various information concerning the distributed node service management system including the distributed node service management mode such as active-standby, for example. Other information which maybe included in the confirmation reply message is user information such as the business company name, machine location, contact information, etc.

The confirmation reply message may also include network information such as the network addresses for each processor node in the network 660 of the distributed node service management system. In addition, the confirmation reply message may also identify the roles of each processor node in the distributed node service management system. Thus, in the scenario above, the confirmation reply message may identify to the processor node 612*a* that the master active node is processor node 604*a* of the cluster 602 master, the first standby node is processor node 604*b* of the cluster 602, a second standby node is processor node 608*a* of the cluster 606 standby, and that processor node 608*b* of the cluster 606 is a member node.

Upon receipt of the confirmation reply message informing the processor node 612*a* of the cluster 610 of the information for the distributed node service management system, the processor node 612*a* populates it's local copy in its data structures 320, and configures the distributed node service management software 360 to run in the same distributed node service management mode currently operating in the distributed node service management of the distributed computing system 600. In this manner, the processor node 612*a* moves in a "join success" transition 844 to the active state in which the processor node 612*a*, upon completion of the configuration process, functions as an active node of the distributed node service management system.

Accordingly, if the distributed node service management system is configured to operate in the active standby mode, and the processor node 612*a* is selected to operate in the standby role within the distributed node service management system, the distributed node service management software 360 of the processor node 612*a* is configured to send notifications of service events occurring at the processor node 612*a* to the master active node 604*a*. In addition, the processor node 612*a* is also configured for sending such events to one or more standby nodes of the distributed node service management system in the event of a failover from the master active node.

If the distributed node service management system is configured to operate in the fully distributed mode, the distributed node service management software 360 of the processor node 612*a* is configured to send notifications of service events concerning the processor node 612*a* directly to a remote support center. Alternatively, if the distributed node service management system is configured to operate in the active distributed standby mode, the distributed node service management software 360 of the processor node 612*a* is configured to send notifications of service events concerning the processor node 612*a* to a master active node 604*a*. In addition, the processor node 612*a* is also configured for sending such events directly to a remote support center in the event of a failure of the master active node. If the distributed node service management system is configured to operate in the service aggregation mode, the distributed node service management software 360 of the processor node 612*a* is configured to send events to one of the master active nodes.

In the illustrated embodiment, upon configuring the distributed node service management software 360 to operate the processor node 612*a* in the distributed node service management role assigned to the processor node 612*a*, the processor node 612*a* generates a test "call home" notification to test whether a successful "call home" message may be transmitted to a remote service center such as the remote service center 634. If the distributed node service management system of the distributed computing system 600 has been configured to operate in a mode which has a master active node, the processor node 612*a* sends the test call home notification to the master active node such as the processor node 604*a* in this example for forwarding by the master active node to the remote service center.

Thus, the master active node 604*a* of the cluster 602 sends the test call home notification to the remote support center. In response to receipt of the test call home notification, the remote support center sends an acknowledgement message back to the master active node 604*a* of the cluster 602. The master active node 604*a* of the cluster 602 in turn forwards an acknowledgement message to the originating processor node 612*a* of the cluster 610.

Upon receipt of the acknowledgement message indicating that the processor node 612*a* has successfully joined the distributed node service management system and has successfully contacted the remote service center via the master active node 604*a*, the processor node 612*a* of the cluster 610 sends a lock release request to the master active node 604*a* of the cluster 602, which releases the distributed node service management system join lock, permitting another processor node in the pending state 814 to request the join lock to initiate the process of joining the distributed node service management system. In addition, the master active node 604*a* of the cluster 602 broadcasts a topology state change notification to all processor nodes in the distributed node service management system of the distributed computing system 600. The topology state change notification directs each of the processor nodes in the distributed node service management system to update their local data structures 380 to include the aforementioned software specification, hardware specification, and operation role for the newly joined processor node 612*a*. Further, the master active node 604*a* of the cluster 602 sends a lock release confirmation to the processor node 612*a* of the cluster 610.

In the event that the processor node 612*a* requires servicing (or otherwise experiences an unexpected error while in one of the pending state 814, joining state 820 or active state 824, the processor node moves back to the offline state 810 in a "service mode/unexpected error" transition 850. In an alternative embodiment, in the event that the processor node 612*a* fails to receive a lock release confirmation, the processor node 612*a* may, in one embodiment, revert to the pending state 814 and refrain from further attempts to join the distributed node service management system until the error condition is cleared.

Similarly, in another embodiment, should the processor node 612*a* during the joining process described above, fail to receive an expected response from the master active node 604*a*, such as a response to a join lock request, a software or hardware specification confirmation reply message, a test call home acknowledgement message, or a lock release confirmation message, the distributed node service management software 360 may direct the processor node 612*a* of the cluster 610 to go into a timed sleep and increment a counter. Such a timed sleep would provide for a suspension of the distributed node service management functions such that data processing functions of the processor node 612*a* pursuant to the data processing software 350 could continue.

After waking up from the sleep, the distributed node service management functions of the processor node 612*a* could issue another request to the master active node 604*a*. If the processor node 612*a* again fails to receive the expected response, the processor node 612*a* of the cluster 610 may again go into a timed sleep and increment a counter.

If the failed attempt counter crosses a threshold value which may have a default value or may be configurable by a user, the processor node 612*a*, under the direction of the distributed node service management software 360 may post an error indicating that it cannot join the distributed node service management system and refrain from further attempts to join the service distributed node service management system. The processor node 612*a* may refrain from further attempts to join the distributed node service management system until the error condition is cleared.

While waiting for the error condition to clear, the processor node 612*a* of the cluster 610 may send a lock release request to the master active node 604*a* of the cluster 602, which releases the distributed node service management system join lock, permitting another processor node in the pending state 814 to request the join lock to initiate the process of joining the distributed node service management system. Further, the master active node 604*a* of the cluster 602 sends a lock release confirmation to the processor node 612*a* of the cluster 610. In response, the processor node 612*a* reverts to the pending state 814 in the "join failure" transition 840.

In those distributed node service management modes which lack a master active node, the processor node 612*a* may send the test call home notification directly to the remote support center and receive the acknowledgement directly from the remote support center. In addition, the processor node 612*a* may broadcast a topology state change notification to all processor nodes in the distributed node service management system of the distributed computing system 600. In this manner, each processor node of the distributed node service management system may be directed to update their local data structures 380 to include the aforementioned software specification, hardware specification, and operation role for the newly joined processor node 612*a*.

In accordance with another aspect of the present description, a user may instruct the distributed node service management system to remove a specific processor node from the service distributed node service management system. In response, the distributed node service management system topology is updated by the master active node to indicate the removal of the particular processor node. In addition, the master active node broadcasts a message to the remaining processor nodes in the distributed node service management system, instructing the remaining processor nodes to update the distributed node service management system topology information maintained in their local data structures 380. In the illustrated embodiment, the copy of the hardware and software specifications of the processor node being removed from the system are no longer used for comparison purposes during the negotiation of a processor node joining the distributed node service management system as described above. In addition, if the user has elected to enable automatic redistribution of service redundancy, the master active node may reassign processor node roles as appropriate, as explained below.

In another aspect of the present description, the distributed node service management system permits users to reassign processor node roles and switch distributed node service management system modes in a non-disruptive, online manner. For example, a user may switch between operating the distributed node service management system from an active standby operational mode to a fully distributed operational mode. In one embodiment, such an operational mode change may include instructing each of the processor nodes of the distributed node service management system to change state from the active state 824 to the pending state 814 in a "topology change" transition 860. Once in the pending state 814, each processor node would initiate the join procedure 714 discussed above, starting with a distributed node service management system join lock request. Accordingly, each processor node is assigned a distributed node service management role in accordance with the selected distributed node service management mode. In addition, each processor node in joining the distributed node service management system learns and records the new distributed node service management system topology. Because the distributed node service management states depicted in FIG. 8 are independent of the data processing functions of a particular processor node, a processor node may enter or leave the distributed node service management states depicted in FIG. 8 without disrupting the data processing functions of the processor node. Consequently, the distributed node service management role of any processor node is likewise independent of the data processing roles of a particular processor node, and the distributed node service management role of any processor node may be readily configured or reconfigured without disrupting the data processing functions of the processor node. Similarly, the distributed node service management mode of operation of the processor nodes is likewise independent of the data processing operations of the processor nodes, and the distributed node service management mode of operation of the processor nodes may be readily configured or reconfigured without disrupting the data processing functions of the processor nodes. Further, any number of processor nodes of the distributed node service management may be configured or reconfigured as health check nodes which perform in a health check mode in the distributed node service management without disrupting the data processing functions being performed by a processor node entering or leaving a health check mode.

In another aspect of the present description, users may also configure the distributed node service management system to enable the distributed node service management software 360 to select a processor node automatically for particular distributed node service management roles in accordance with processor node capabilities. For example, if the current master active node is a computing device having a single quad core processor, and another computing device having greater capability such as a computing device having four by eight core processors, joins the distributed node service management system, the distributed node service management software 360 may be configured to detect this and redistribute the master active role from the original processor node to the more capable processor node.

In another example, the current master active node may be a computing device which communicates with a remote support center via modem. When a new processor node joins the distributed node service management system and the new processor node has the capability of broadband communication with the remote support center, the distributed node service management software may be configured to detect this and redistribute the master active role from the original processor node having the modem communication to the more capable processor node having the broad band communication capability.

In still another aspect of the present description, if a processor node of the distributed node service management system encounters a failure or otherwise leaves the distributed node service management system, the distributed node service management system may be configured by the user to automatically identify the processor nodes remaining in the distributed node service management and redistribute the distributed node service management roles as needed amongst the remaining processor nodes of the distributed node service management system. For example, upon a failure of a processor node in performing its functions within the distributed node service management system, or upon withdrawal of a processor node from the distributed node service management system, the distributed node service management system may instruct each of the remaining processor nodes of the distributed node service management system to change state from the active state 824 to the pending state 814 in the "topology change" transition 860. Once in the pending state 814, each processor node would initiate the join procedure 714 discussed above, starting with a distributed node service management system join lock request. Accordingly, each processor node is reassigned a distributed node service management role in accordance with the selected distributed node service management mode, and providing a substitute processor node for the distributed node service management role vacated by the original processor node which encountered an error or withdrew from the distributed node service management system, to restore a selected level of redundancy. In addition, each processor node in joining the distributed node service management system learns and records the new distributed node service management system topology. In this manner, in response to a loss of redundancy in the distributed node service management roles, the processor nodes of the distributed computing system may be automatically reconfigured to perform distributed node service management in a different redistribution of distributed node service management roles as a function of the selected mode of operation and to restore redundancy in the distributed node service management roles.

Additional Embodiment Details

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, an application specific integrated circuit (ASIC), a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that may contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that may communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that may direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The variables "a" and "b" when used to represent a variable number of an element may indicate any number of instances of the element, and may indicate different integer numbers when used with different elements or when used with different instances of the same element. For instance variables "a" and "b" used to indicate a number of a source storage and target storage may indicate the same or different number of these elements.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of FIGS. 4, 5, 7, 8 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention may be made without departing from the spirit and scope of the invention, the invention resides in the claims herein after appended.

What is claimed is:

1. A method, comprising:
performing data processing functions at each of a plurality of processor nodes including performing data processing functions at a first processor node in a first data processing role, in a distributed computing system having said plurality of processor nodes;
selecting a first mode of operation of a distributed node health support service management system by said plurality of processor nodes in said distributed computing system including said first processor node; and
in response to selection of a first mode of operation of the distributed node health support service management system, configuring said first processor node to also perform distributed node health support service management in a first distributed node health support service management role as a function of the selected first mode of operation, wherein the distributed node health support service management in the first distributed node health support service management role at said first processor node includes processing a service request for servicing the distributed computing system;
wherein said configuring configures said first processor node to perform distributed node health support service management in a master distributed node health support service management role which includes joining additional processor nodes in said distributed computing system to said distributed node health support service management system, wherein the joining additional processor nodes in the distributed computing system to the distributed node health support service management system includes assigning a distributed node health support service management role to a processor node joining the distributed node health support service management system, wherein the distributed node health support service management role assigned to a processor node joining the distributed node health support service management system is a function of preselected user preferences, and wherein the distributed computing system comprises clusters in which each cluster includes at least two of the plurality of processor nodes of the distributed computing system, and wherein the distributed node health support service management role assigned to a processor node joining the distributed node health support service management system is one of a master, standby, and member distributed node health support service management role and is a function of a preselected user preference that each cluster of the distributed computing system have at least one processor node perform distributed node health support service management in a standby distributed node health support service management role.

2. The method of claim 1 wherein performing distributed node health support service management by the first processor node in the master distributed node health support service management role further includes providing a join lock to a second processor node to prevent other processor nodes from joining the distributed node health support service management system while the second processor node has the join lock.

3. The method of claim 1 wherein performing distributed node health support service management by the first processor node in the master distributed node health support service management role further includes qualifying a second processor node to determine if the second processor node is qualified to join the distributed node health support service management system before joining the second processor node to the distributed node health support service management system.

4. The method of claim 3 wherein the qualifying a second processor node to determine if the second processor node is qualified to join the distributed node health support service management system, is a function of a comparison of versions of at least one of hardware and software maintained at the second processor node, relative to versions of at least one of hardware and software maintained at other processor nodes previously joined to the distributed node health support service management system.

5. The method of claim 1 wherein the distributed node health support service management role assigned to a processor node joining the distributed node health support service management system is a function of a preselected user preference that the number of processor nodes operating in a standby distributed node health support service management role meet or exceed a preselected percentage of the total processor nodes joined to the distributed node health support service management system.

6. The method of claim 1 wherein the distributed node health support service management role assigned to a processor node joining the distributed node health support service management system is selected by a user.

7. The method of claim 1 wherein the first processor node performing distributed node health support service management in the master distributed node health support service management role further includes obtaining a network IP address for addressing the first processor node within a network providing communication paths among the processor nodes in the distributed computing system.

8. The method of claim 1 wherein the distributed node health support service management role assigned to a processor node joining the distributed node health support service management system is a function of capabilities of the processor node joining the distributed node health support service management system.

9. The method of claim 1 further comprising in response to the selection of the first mode of operation of the distributed node health support service management system, configuring additional processor nodes of the distributed computing system to also perform distributed node health support service management in distributed node health support service management roles as a function of the selected first mode of operation, wherein the configuring of processor nodes is performed independently of data processing functions at the processor nodes being configured so that the data processing functions at the processor nodes being configured are not disrupted by the configuring of the processor nodes to perform distributed node health support service management.

10. The method of claim 9 further comprising selecting a second mode of operation of a distributed node health support service management system by said plurality of processor nodes in said distributed computing system, and in response to the selection of the second mode of operation of the distributed node health support service management system, reconfiguring processor nodes of the distributed computing system to perform distributed node health support service management in distributed node health support service management roles as a function of the selected second mode of operation, wherein the reconfiguring of processor nodes is performed independently of data processing functions at the processor nodes being reconfigured so that the data processing functions at the processor nodes being reconfigured are not disrupted by the reconfiguring of the processor nodes to perform distributed node health support service management.

11. The method of claim 1 further comprising in response to the selection of the first mode of operation of the distributed node health support service management system, configuring additional processor nodes of the distributed computing system to also perform distributed node health support service management in a first distribution of distributed node health support service management roles as a function of the selected first mode of operation and to provide redundancy in the distributed node health support service management roles, and in response to a loss of redundancy in the distributed node health support service management roles, reconfiguring processor nodes of the distributed computing system to perform distributed node health support service management in a second distribution of distributed node health support service management roles as a function of the selected first mode of operation and to restore redundancy in the distributed node health support service management roles.

12. The method of claim 1 further comprising in response to the selection of the first mode of operation of the distributed node health support service management system, configuring selected additional processor nodes of the distributed computing system to also perform distributed node health support service management in distributed node health support service management role which includes a health check function to detect errors in connection with the distributed node health support service management operations of other processor nodes of the distributed computing system, wherein the health check function includes sending a request message to each active node in the distributed computing system to determine their current operational status, and wherein any of the plurality of processor nodes in said distributed computing system may be selected to perform distributed node health support service management in a distributed node health support service management role which includes the health check function and wherein the configuring of processor nodes is performed independently of data processing functions at the processor nodes being configured so that the data processing functions at the processor nodes being configured are not disrupted by the configuring of the processor nodes to perform distributed node health support service management.

13. A computer program product for managing a distributed computing system having a plurality of processor nodes, the computer program product comprising a non-transitory computer readable storage medium having computer readable program code embodied therein for execution by a processor to perform managing operations, the managing operations comprising:

performing data processing functions at each of the plurality of processor nodes including performing data processing functions at a first processor node in a first data processing role, in the distributed computing system having said plurality of processor nodes;

selecting a first mode of operation of a distributed node health support service management system by said plurality of processor nodes in said distributed computing system including said first processor node; and in response to selection of a first mode of operation of the distributed node health support service management system, configuring said first processor node to also perform distributed node health support service management in a first distributed node health support service management role as a function of the selected first mode of operation, wherein the distributed node health support service management in the first distributed node health support service management role at said first processor node includes processing a service request for servicing the distributed computing system;

wherein said configuring configures said first processor node to perform distributed node health support service management in a master distributed node health support service management role which includes joining additional processor nodes in said distributed computing system to said distributed node health support service management system, wherein the joining additional processor nodes in the distributed computing system to the distributed node health support service management system includes assigning a distributed node health support service management role to a processor node joining the distributed node health support service management system, wherein the distributed node health support service management role assigned to a processor node joining the distributed node health support service management system is a function of preselected user preferences, and wherein the distributed computing system comprises clusters in which each cluster includes at least two of the plurality of processor nodes of the distributed computing system, and wherein the distributed node health support service management role assigned to a processor node joining the distributed node health support service management system is one of a master, standby, and member distributed node health support service management role and is a function of a preselected user preference that each cluster of the distributed computing system have at least one processor node perform distributed node health support service management in a standby distributed node health support service management role.

14. The computer program product of claim 13 wherein performing distributed node health support service management by the first processor node in the master distributed node health support service management role further includes providing a join lock to a second processor node to prevent other processor nodes from joining the distributed node health support service management system while the second processor node has the join lock.

15. The computer program product of claim 13 wherein performing distributed node health support service management by the first processor node in the master distributed node health support service management role further includes qualifying a second processor node to determine if the second processor node is qualified to join the distributed node health support service management system before joining the second processor node to the distributed node health support service management system.

16. The computer program product of claim 15 wherein the qualifying a second processor node to determine if the second processor node is qualified to join the distributed node health support service management system, is a function of a comparison of versions of at least one of hardware and software maintained at the second processor node, relative to versions of at least one of hardware and software maintained at other processor nodes previously joined to the distributed node health support service management system.

17. The computer program product of claim 13 wherein the distributed node health support service management role assigned to a processor node joining the distributed node health support service management system is one of a master, standby, and member distributed node health support service management role and is a function of a preselected user preference that the number of processor nodes operating in a standby distributed node health support service management role meet or exceed a preselected percentage of the total processor nodes joined to the distributed node health support service management system.

18. The computer program product of claim 13 wherein the distributed node health support service management role assigned to a processor node joining the distributed node health support service management system is selected by a user.

19. The computer program product of claim 13 wherein the first processor node performing distributed node health support service management in the master distributed node health support service management role further includes obtaining a network IP address for addressing the first processor node within a network providing communication paths among the processor nodes in the distributed computing system.

20. The computer program product of claim 13 wherein the distributed node health support service management role assigned to a processor node joining the distributed node health support service management system is a function of capabilities of the processor node joining the distributed node health support service management system.

21. The computer program product of claim 13 further comprising in response to the selection of the first mode of operation of the distributed node health support service management system, configuring additional processor nodes of the distributed computing system to also perform distributed node health support service management in distributed node health support service management roles as a function of the selected first mode of operation, wherein the configuring of processor nodes is performed independently of data processing functions at the processor nodes being configured so that the data processing functions at the processor nodes being configured are not disrupted by the configuring of the processor nodes to perform distributed node health support service management.

22. The computer program product of claim 21 further comprising selecting a second mode of operation of a distributed node health support service management system by said plurality of processor nodes in said distributed computing system, and in response to the selection of the second mode of operation of the distributed node health support service management system, reconfiguring processor nodes of the distributed computing system to perform distributed node health support service management in distributed node health support service management roles as a function of the selected second mode of operation, wherein the reconfiguring of processor nodes is performed independently of data processing functions at the processor nodes being reconfigured so that the data processing functions at the processor nodes being reconfigured are not disrupted by the reconfiguring of the processor nodes to perform distributed node health support service management.

23. The computer program product of claim 13 further comprising in response to the selection of the first mode of operation of the distributed node health support service management system, configuring additional processor nodes of the distributed computing system to also perform distributed node health support service management in a first distribution of distributed node health support service management roles as a function of the selected first mode of operation and to provide redundancy in the distributed node health support service management roles, and in response to a loss of redundancy in the distributed node health support service management roles, reconfiguring processor nodes of the distributed computing system to perform distributed node health support service management in a second distribution of distributed node health support service management roles as a function of the selected first mode of operation and to restore redundancy in the distributed node health support service management roles.

24. The computer program product of claim 13 further comprising in response to the selection of the first mode of operation of the distributed node health support service management system, configuring selected additional processor nodes of the distributed computing system to also perform distributed node health support service management in distributed node health support service management role which includes a health check function to detect errors in connection with the distributed node health support service management operations of other processor nodes of the distributed computing system, wherein the health check function includes sending a request message to each active node in the distributed computing system to determine their current operational status, and wherein any of the plurality of processor nodes in said distributed computing system may be selected to perform distributed node health support service management in a distributed node health support service management role which includes the health check function and wherein the configuring of processor nodes is performed independently of data processing functions at the processor nodes being configured so that the data processing functions at the processor nodes being configured are not disrupted by the configuring of the processor nodes to perform distributed node health support service management.

25. A distributed computing system, comprising:
a plurality of processor nodes; and
a computer readable storage medium having computer readable program code embodied therein executed by processor nodes to perform computing operations, the computing operations comprising:
performing data processing functions at each of the plurality of processor nodes including performing data processing functions at a first processor node in a first data processing role, in the distributed computing system having said plurality of processor nodes;
selecting a first mode of operation of a distributed node health support service management system by said plurality of processor nodes in said distributed computing system including said first processor node; and
in response to selection of a first mode of operation of the distributed node health support service management system, configuring said first processor node to also perform distributed node health support service management in a first distributed node health support service management role as a function of the selected first mode of operation, wherein the distributed node health support service management in the first distributed node health support service management role at said first processor node includes processing a service request for servicing the distributed computing system, wherein said configuring configures said first processor node to perform distributed node health support service management in a master distributed node health support service management role which includes joining additional processor nodes in said distributed computing system to said distributed node health support service management system, wherein the joining additional processor nodes in the distributed computing system to the distributed node health support service management system includes assigning a distributed node health support service management role to a processor node joining the distributed node health support service management system, wherein the distributed node health support service management role assigned to a processor node joining the distributed node health support service management system is a function of preselected user preferences, wherein the distributed computing system comprises clusters in which each cluster includes at least two of the plurality of processor nodes of the distributed computing system, and wherein the distributed node health support service management role assigned to a processor node joining the distributed node health support service management system is one of a master, standby, and member distributed node health support service management role and is a function of a preselected user preference that each cluster of the distributed computing system have at least one processor node perform distributed node health support service management in a standby distributed node health support service management role.

26. The system of claim 25 wherein performing distributed node health support service management by the first processor node in the master distributed node health support service management role further includes providing a join lock to a second processor node to prevent other processor nodes from joining the distributed node health support service management system while the second processor node has the join lock.

27. The system of claim 25 wherein performing distributed node health support service management by the first processor node in the master distributed node health support service management role further includes qualifying a second processor node to determine if the second processor node is qualified to join the distributed node health support service management system before joining the second processor node to the distributed node health support service management system.

28. The system of claim 27 wherein the qualifying a second processor node to determine if the second processor node is qualified to join the distributed node health support service management system, is a function of a comparison of versions of at least one of hardware and software maintained at the second processor node, relative to versions of at least one of hardware and software maintained at other processor nodes previously joined to the distributed node health support service management system.

29. The system of claim 25 wherein the distributed node health support service management role assigned to a processor node joining the distributed node health support service management system is one of a master, standby, and member distributed node health support service management role and is a function of a preselected user preference that the number of processor nodes operating in a standby distributed node health support service management role meet or exceed a preselected percentage of the total processor nodes joined to the distributed node health support service management system.

30. The system of claim 25 wherein the distributed node health support service management role assigned to a processor node joining the distributed node health support service management system is selected by a user.

31. The system of claim 25 wherein the first processor node performing distributed node health support service management in the master distributed node health support service management role further includes obtaining a network IP address for addressing the first processor node within a network providing communication paths among the processor nodes in the distributed computing system.

32. The system of claim 25 wherein the distributed node health support service management role assigned to a processor node joining the distributed node health support service management system is a function of capabilities of the processor node joining the distributed node health support service management system.

33. The system of claim 25 further comprising in response to the selection of the first mode of operation of the distributed node health support service management system, configuring additional processor nodes of the distributed computing system to also perform distributed node health support service management in distributed node health support service management roles as a function of the selected first mode of operation, wherein the configuring of processor nodes is performed independently of data processing functions at the processor nodes being configured so that the data processing functions at the processor nodes being configured are not disrupted by the configuring of the processor nodes to perform distributed node health support service management.

34. The system of claim 33 further comprising selecting a second mode of operation of a distributed node health support service management system by said plurality of processor nodes in said distributed computing system, and in response to the selection of the second mode of operation of the distributed node health support service management system, reconfiguring processor nodes of the distributed computing system to perform distributed node health support service management in distributed node health support service management roles as a function of the selected second mode of operation, wherein the reconfiguring of processor nodes is performed independently of data processing functions at the processor nodes being reconfigured so that the data processing functions at the processor nodes being reconfigured are not disrupted by the reconfiguring of the processor nodes to perform distributed node health support service management.

35. The system of claim 25 further comprising in response to the selection of the first mode of operation of the distributed node health support service management system, configuring additional processor nodes of the distributed computing system to also perform distributed node health support service management in a first distribution of distributed node health support service management roles as a function of the selected first mode of operation and to provide redundancy in the distributed node health support service management roles, and in response to a loss of redundancy in the distributed node health support service management roles, reconfiguring processor nodes of the distributed computing system to perform distributed node health support service management in a second distribution of distributed node health support service management roles as a function of the selected first mode of operation and to restore redundancy in the distributed node health support service management roles.

36. The system of claim 25 further comprising in response to the selection of the first mode of operation of the distributed node health support service management system, configuring selected additional processor nodes of the distributed computing system to also perform distributed node health support service management in distributed node health support service management role which includes a health check function to detect errors in connection with the distributed node health support service management operations of other processor nodes of the distributed computing system, wherein the health check function includes sending a request message to each active node in the distributed computing system to determine their current operational status, and wherein any of the plurality of processor nodes in said distributed computing system may be selected to perform distributed node health support service management in a distributed node health support service management role which includes the health check function and wherein the configuring of processor nodes is performed independently of data processing functions at the processor nodes being configured so that the data processing functions at the processor nodes being configured are not disrupted by the configuring of the processor nodes to perform distributed node health support service management.

\* \* \* \* \*